(12) United States Patent
Steinhoff et al.

(10) Patent No.: US 12,505,399 B2
(45) Date of Patent: Dec. 23, 2025

(54) SYSTEM AND METHOD FOR PROVIDING A PERSONALIZED ASSESSMENT REPORT

(71) Applicant: Korn Ferry, Los Angeles, CA (US)

(72) Inventors: Thomas Neal Steinhoff, San Gabriel, CA (US); Bryan Andrew Ackermann, Scottsdale, AZ (US); Rajesh Mandyam, Granada Hills, CA (US)

(73) Assignee: Korn Ferry, Los Angeles, CA (US)

( * ) Notice: Subject to any disclaimer, the term of this patent is extended or adjusted under 35 U.S.C. 154(b) by 0 days.

(21) Appl. No.: 18/207,515

(22) Filed: Jun. 8, 2023

(65) Prior Publication Data

US 2023/0401515 A1 Dec. 14, 2023

Related U.S. Application Data

(60) Provisional application No. 63/351,640, filed on Jun. 13, 2022.

(51) Int. Cl.
*G06F 3/048* (2013.01)
*G06F 3/0482* (2013.01)
(Continued)

(52) U.S. Cl.
CPC ....... *G06Q 10/0639* (2013.01); *G06F 3/0482* (2013.01); *G06F 3/0483* (2013.01); *G06F 3/04845* (2013.01); *G06F 3/167* (2013.01)

(58) Field of Classification Search
CPC .. G06F 3/0482; G06F 3/0483; G06F 3/04845; G06F 3/167; G06Q 10/0639
See application file for complete search history.

(56) References Cited

U.S. PATENT DOCUMENTS

2006/0061597 A1* 3/2006 Hui ............... G06F 3/0481 345/629
2008/0034038 A1* 2/2008 Ciudad ............ G06Q 10/107 709/204

(Continued)

OTHER PUBLICATIONS

How to: access, create and share templates (Synthesia) Feb. 8, 2022 [online] [retrieved on Sep. 18, 2023]. Retrieved from the Internet URL:https://www.youtube.com/watch?v=gqz-Yk-Alsc, entire document, especially 0:12-0:30.

(Continued)

*Primary Examiner* — Mahelet Shiberou
(74) *Attorney, Agent, or Firm* — Morrison & Foerster LLP

(57) ABSTRACT

The present disclosure generally relates to methods for generating and presenting a user-specific personal assessment report. The methods include receiving, from a user, a plurality of answers corresponding to a plurality of questions in a personal assessment questionnaire, generating, based on the answers, a user-specific personal assessment report including a plurality of static pages, and displaying a user interface for presenting the user-specific personal assessment report, where the user interface includes a report region for displaying a page of the plurality of static pages and an avatar region for presenting a video of an avatar, wherein the avatar is configured to be partially overlaid on the report region. The method further includes receiving the user input (Continued)

initiating playback of the user interface, and initiating playback of the video of the avatar providing speech in the avatar region, wherein the speech of the avatar comprises an audio paraphrase of the page.

23 Claims, 31 Drawing Sheets

(51) Int. Cl.
*G06F 3/0483* (2013.01)
*G06F 3/04845* (2022.01)
*G06F 3/16* (2006.01)
*G06Q 10/0639* (2023.01)

(56) References Cited

U.S. PATENT DOCUMENTS

| | | |
|---|---|---|
| 2010/0028846 A1 | 2/2010 | Cohen et al. |
| 2012/0165618 A1 | 6/2012 | Algoo et al. |
| 2014/0163331 A1 | 6/2014 | Horseman |
| 2014/0331176 A1* | 11/2014 | Cheng .................. G09B 29/106 |
| | | 715/808 |
| 2017/0147775 A1 | 5/2017 | Ohnemus et al. |
| 2017/0206797 A1* | 7/2017 | Solomon ................ G06N 3/006 |
| 2020/0043114 A1* | 2/2020 | Viswanathan ........... G09B 5/00 |
| 2021/0247882 A1* | 8/2021 | Norman ................ G06F 3/0484 |
| 2023/0177878 A1* | 6/2023 | Sekar ..................... G06F 40/40 |
| | | 382/103 |

OTHER PUBLICATIONS

How to: preview, share, embed or download a video (Synthesia) Feb. 8, 2022 [online] [retrieved on Sep. 18, 2023]. Retrieved from the Internet URL:https:llwww.youtube.com/watch?vG-CvA4pJTeQ, entire document, especially 0:15-0:34.

International Search Report and Written Opinion mailed Oct. 5, 2023, for PCT Application No. PCT/US23/68147, filed Jun. 8, 2023, 13 pages.

Use Avatar Video Quizzes to Increase Engagement (Synthesia) Jun. 9, 2022 [online] [retrieved on Sep. 19, 2023]. Retrieved from the Internet URL:https://www.youtube.com/watch?v8xUX6X4TNxs, entire document, especially 20:30-21:55.

International Preliminary Report on Patentability and Written Opinion mailed Dec. 26, 2024, for PCT Application No. PCT/US23/68147, filed Jun. 8, 2023, ten pages.

* cited by examiner

PERSONAL ASSESSMENT QUESTIONNAIRE — 120

Behavioral Competencies

- BUILDS NETWORKS
- INTERPERSONAL SAVVY
- PERSUADES
- DRIVES RESULTS
- COLLABORATES
- PLANS AND ALIGNS
- INSTILLS TRUST
- COMMUNICATES EFFECTIVELY
- MANAGES AMBIGUITY
- STRATEGIC MINDSET
- BALANCES STAKEHOLDERS
- DECISION QUALITY
- CUSTOMER FOCUS
- GLOBAL PERSPECTIVE
- ACTION ORIENTED

Traits

- FOCUS
- SITUATIONAL SELF-AWARENESS
- ASSERTIVENESS
- ADAPTABILITY
- NEED FOR ACHIEVEMENT
- HUMILITY
- TOLERANCE OF AMBIGUITY
- SOCIABILITY
- COMPOSURE
- RISK-TAKING
- OPTIMISM
- PERSISTENCE
- AFFILIATION
- TRUST
- CREDIBILITY
- EMPATHY

Drivers

- STRUCTURE
- INDEPENDENCE
- BALANCE
- COLLABORATION
- CHALLENGE
- POWER

| personal metric/subtopic | background | high.score | low.score |
|---|---|---|---|
| Navigate change | This involves stepping up as a leader in times of change, making necessary adjustments to deliver results, and encouraging innovation and thoughtful risk-taking. | You may tend to explore new possibilities, take ideas from vision to reality, and lead others through change. | You may tend to favor proven ways to work, rather than change your approach or test new ideas. |
| Guide the team's work | This involves allocating work equitably and ensuring appropriate metrics, roles, and people are in place. It also involves actively prioritizing work and resources to support strong and sustainable performance. | You likely provide your team with clear targets and support in order to ensure equitable assignments and sustain high performance. | You might take a less structured approach to sustaining high performance and to organizing and equitably assigning your team's work. |
| Align goals | Aligning goals involves setting and communicating team priorities that support organizational goals, as well as aligning team strategy, processes, and decisions with partner teams. | You likely align your team with Company X's goals and coordinate with partner teams. | When setting goals, you might not yet consistently communicate them or coordinate with others. |

Joseph Johnson
Business Development Manager Acme Corp

Cover:
Introduction (:22)

About This Report:
Overview (:19)

How To Read This Report:
Understanding Symbols (:30)
Success Profile (:15)
The Scales (:13)

Summary:
My Success Profile (:14)
Builds Networks (:27)
Focus (:13)
Structure (:23)

Behaviorial Competencies:
Digging Deeper (:35)
What We Measure (:12)
Take Your Time (:10)
Top Strengths
Cultivates Innovation (:11)
Values Differences (:09)
Manages Conflict (:07)
Understanding your Strenghts

DEVELOPMENT

PARTICIPANT DEVELOPMENT REPORT
Joseph Johnson

ORGANIZATION    KFA ACME Stage
SUCCESS PROFILE Business Development Manager
ASSESSED        February 2, 2021
CREATED         February 2, 2021

KORN FERRY

Personal Development Report

Joseph Johnson
Business Development Manager Acme Corp

Cover:
Introduction (:22)
About This Report:
Overview (:19)
How To Read This Report:
Understanding Symbols (:30)
Success Profile (:15)
The Scales (:13)
Summary:
My Success Profile (:14)
Builds Networks (:27)
Focus (:13)
Structure (:23)
Behavioral Competencies:
Digging Deeper (:35)
What We Measure (:12)
Take Your Time (:10)
Top Strengths
Cultivates Innovation (:11)
Values Differences (:09)
Manages Conflict (:07)
Understanding Your Strengths
Cultivates Innovation (:10)
Values Differences (:08)
Manages Conflict (:09)
Reflect (:07)
Explore (:13)
Builds Networks (:09)

PARTICIPANT DEVELOPMENT REPORT                    CSPTest Persona Suma |February 2, 2021

SUMMARY:

SUCCESS PROFILE: BUSINESS DEVELOPMENT MANAGER|

This summary indicates your assessment results compared with the success profile capabilities for behavioral competencies, traits, and drivers. It can help you reflect on how you typically approach work, and on your strengths and development needs.

The subsequent sections provide feedback on additional capabilities, not just those in the success profile. This will help you consider other capabilities that you want to develop in the longer-term.

BEHAVIORAL COMPETENCIES

- Builds Networks
- Persuades
- Drives Results
- Collaborates
- Plans and Aligns

- Interpersonal Savvy
- Instills Trust
- Communicates Effectively
- Customer Focus
- Action Oriented

TRAITS

- Focus
- Need for Achievement
- Sociability
- Composure
- Optimism
- Persistence
- Trust
- Credibility Drivers

- Structure
- Independence
- Balance
- Collaboration
- Challenge
- Power

LEGEND
Ideal range    Key development opportunity

FIG. 3

Personal Development Report

Joseph Johnson
Business Development Manager Acme Corp

Cover:
Introduction (:22)
About This Report:
Overview (:19)
How To Read This Report:
Understanding Symbols (:30)
Success Profile (:15)
The Scales (:13)
Summary:
My Success Profile (:14)
Builds Networks (:27)
Focus (:13)
Structure (:23)
Behavioral Competencies:
Digging Deeper (:35)
What We Measure (:12)
Take Your Time (:10)
Top Strengths
Cultivates Innovation (:11)
Values Differences (:09)
Manages Conflict (:07)
Understanding Your Strengths
Cultivates innovation (:10)
Values Differences (:08)
Manages Conflict (:09)
Reflect (:07)
Explore (:13)
Builds Networks (:09)

PARTICIPANT DEVELOPMENT REPORT          CSPTest Persona Suma | February 2, 2021

SUMMARY:

SUCCESS PROFILE: BUSINESS DEVELOPMENT MANAGER

This summary indicates your assessment results compared with the success profile capabilities for behavioral competencies, traits, and drivers. It can help you reflect on how you typically approach work, and on your strengths and development needs.

The subsequent sections provide feedback on additional capabilities, not just those in the success profile. This will help you consider other capabilities that you want to develop in the longer-term.

BEHAVIORAL COMPETENCIES
- Builds Networks — Interpersonal Savvy
- Persuades — Instills Trust
- Drives Results — Communicates Effectively
- Collaborates — Customer Focus
- Plans and Aligns — Action Oriented Drive
- Stru
- Ind
- Bala
- Coll
- Cha
- Powe

TRAITS
- Focus
- Need for Achievement
- Sociability
- Composure
- Optimism
- Persistence
- Trust
- Credibility LEGEND: Ideal range | Key development opportunity "Now on the third page we are going to start looking at your own results"

SYSTEM AND METHOD FOR PROVIDING A PERSONALIZED ASSESSMENT REPORT

CROSS REFERENCE TO RELATED APPLICATIONS

This application claims the benefit of U.S. Provisional Application No. 63/351,640, filed Jun. 13, 2022, which is incorporated herein by reference in its entirety.

FIELD OF THE DISCLOSURE

This disclosure relates generally to systems and methods for presenting an individualized personal assessment report, more specifically, to systems and methods for presenting an individualized personal assessment report using an avatar.

BACKGROUND

Personal assessment questionnaires can be used by individuals to identify strengths and weaknesses. Learning about strengths and weaknesses can be used to facilitate personal growth by allowing individuals to harness their strengths and improve upon their weaknesses. For example, employers may distribute assessment questionnaires to employees to facilitate growth and improvement of employees in the workplace. These questionnaires may include a plurality of questions regarding, among other things, the traits, competencies, drivers, values, interests, work styles, and work habits, of the employee. The results of the assessment questionnaire can highlight strengths as well as areas of improvement for the employees.

The results of the assessment can be delivered to the individual in a few ways. For example, an individual could conduct a self-review, where the individual reviews a report based on the assessment questionnaire; or the individual may receive one-on-one feedback, where the individual meets with an expert or professional in the field (e.g., a licensed psychologist) who can go over the assessment report with the individual. For individuals who self-review, the individual may not fully comprehend the report or may not be fully engaged with the report. For example, the individual may have questions that are not addressed by the report itself. On the other hand, coordinating and receiving one-on-one feedback can be time consuming and expensive. Accordingly, there is a need to present the results of an assessment report to a user in a relevant and personalized manner to keep the individual engaged and provide information to address questions that may arise.

However, there are technical challenges to providing software features that can achieve these goals in an intelligent, dynamic, and computationally efficient manner. For example, providing customized and individualized user interfaces can be computationally expensive, particularly if the user interfaces include animated content to make the user interfaces more engaging. Conventional methods of implementing customized user interfaces may require excessive processing power, memory usage, and power consumption.

BRIEF SUMMARY

Embodiments of the present disclosure provide systems and methods for presenting intelligent, dynamic, and computationally efficient software features that can be used to provide a personalized self-assessment. Personal assessment questionnaires can be salient tools for promoting growth and improvement of an individual by enabling the individual to identify strengths and weaknesses and leverage those strengths and improve upon those weaknesses. Embodiments in accordance with this disclosure aim to present the results of an assessment report to a user in an intelligent, dynamic, and computationally efficient manner.

Embodiments of the present disclosure provide systems and methods that can render personalized user interfaces in a computationally efficient way by, for example, making the graphical user interface more engaging by incorporating animated avatars. In one or more examples, the avatars may be generated using machine-learning techniques. In one or more examples, the avatars can be configured to deliver individualized content that is specific to a user based on the results of the user's personal assessment questionnaire. Conventional methods of implementing graphical user interfaces in this context may not incorporate avatars and/or deliver the same animated content to multiple users.

Embodiments of the present disclosure can further provide systems and methods for efficiently retrieving the avatar content. For example, the avatar content can be obtained from a video repository dynamically based on user-specific settings. In one or more examples, the avatar content can be pre-generated and stored in the video repository. In this manner, systems and methods of the present disclosure can reduce the processing power, memory usage, and power consumption associated with generating individualized videos for specific users while providing user-specific feedback.

Embodiments of the present disclosure can further provide systems and methods for efficiently rendering the avatar. For example, the avatar can be automatically overlaid onto static pages of a report at an appropriate location. In this manner, the system can provide an engaging and personalized user interface without requiring excessive processing power and memory usage associated with presenting a user interface associated with the report and a separate user interface associated with the avatar. Such techniques may permit the content presented on the report to be synced with the speech delivered by the avatar, such that the avatar discusses the content currently displayed by the report.

Embodiments of the present disclosure include systems and methods for generating and presenting a user-specific personal assessment report. In one or more examples, methods according to embodiments of this disclosure can include receiving, from a user, a plurality of answers corresponding to a plurality of predetermined questions in a personal assessment questionnaire, generating, based on the plurality of answers, the user-specific personal assessment report comprising a plurality of static pages; displaying a user interface for presenting the user-specific personal assessment report, the user interface comprising: a report region for displaying a page of the plurality of static pages; and an avatar region for presenting a video of an avatar, wherein the avatar is configured to be partially overlaid on the report region; receiving the user input initiating playback of the user interface; and in response to receiving the user input, initiating playback of the video of the avatar providing speech in the avatar region, wherein the speech of the avatar comprises an audio paraphrase of the page.

In one or more examples the method can further include obtaining a plurality of scores based on the plurality of answers; generating a script based on the plurality of scores; and selecting a one or more of videos of the avatar from a video repository based on the script. In one or more examples, the video repository can include a plurality of pre-generated videos of the avatar. In one or more examples, the method can further include obtaining the plurality of pre-generated videos of the avatar, wherein the plurality of pre-generated videos of the avatar are obtained using one or more machine-learning models.

In one or more examples, the user interface further comprises a navigation region comprising a plurality of topics for navigating to the plurality of static pages. In one or more examples, the page of the static pages is associated with a topic of the plurality of topics. In one or more examples, the method can further include receiving a second user input indicative of a selection of a topic of the plurality of topics; in response to receiving the second user input, displaying a second page of the static pages; and initiating playback of a second video of the avatar in the avatar region, wherein the second video comprises an audio paraphrase of the second page. In one or more examples, the method can further include receiving a third user input for initiating playback of the second video.

In one or more examples, wherein the speech of the avatar comprises background information associated without reciting verbatim the textual content displayed on the page of the user-specific personal assessment report. In one or more examples, a location of the avatar is determined based in part on a location of content displayed on the page. In one or more examples, the method can further include receiving a user input indicative of resizing a window of the user interface from a first size to a second size, and adjusting an amount of overlap between the avatar region and report region based on the resizing of the window. In one or more examples, the method can further include highlighting a first portion of the page displayed in the report region based on the speech of the avatar.

Embodiments of the present disclosure further include systems for generating and presenting a user-specific personal assessment report. In one or more examples, the systems can include one or more processors and a memory communicatively coupled to the one or more processors and configured to store instructions that. In one or more examples, the memory, when executed by the one or more processors, cause the system to: receive, from a user, a plurality of answers corresponding to a plurality of predetermined questions in a personal assessment questionnaire; generate, based on the plurality of answers, the user-specific personal assessment report comprising a plurality of static pages; display a user interface for presenting the user-specific personal assessment report, the user interface comprising: a report region for displaying a page of the plurality of static pages and an avatar region for presenting a video of an avatar, wherein the avatar is configured to be partially overlaid on the report region; receive the user input initiating playback of the user interface; and in response to receiving the user input, initiate playback of the video of the avatar providing speech in the avatar region, wherein the speech of the avatar comprises an audio paraphrase of the page.

In one or more examples, the system may be further caused to obtain a plurality of scores based on the plurality of answers; generate a script based on the plurality of scores; and select a one or more of videos of the avatar from a video repository based on the script. In one or more examples, the speech of the avatar can include background information associated without reciting verbatim the textual content displayed on the page of the user-specific personal assessment report. In one or more examples, the user interface can further include a navigation region comprising a plurality of topics for navigating to the plurality of static pages.

Embodiments of the present disclosure further include non-transitory computer-readable storage medium storing one or more programs, the one or more programs comprising instructions. In one or more examples, when the instructions can cause the system to perform a method when executed by one or more processors of a system. In such examples the method may include receiving, from a user, a plurality of answers corresponding to a plurality of predetermined questions in a personal assessment questionnaire, generating, based on the plurality of answers, the user-specific personal assessment report comprising a plurality of static pages; displaying a user interface for presenting the user-specific personal assessment report, the user interface comprising: a report region for displaying a page of the plurality of static pages; and an avatar region for presenting a video of an avatar, wherein the avatar is configured to be partially overlaid on the report region; receiving the user input initiating playback of the user interface; and in response to receiving the user input, initiating playback of the video of the avatar providing speech in the avatar region, wherein the speech of the avatar comprises an audio paraphrase of the page.

In one or more examples, the method executed by the computer-readable storage medium can further include obtaining a plurality of scores based on the plurality of answers; generating a script based on the plurality of scores; and selecting a one or more of videos of the avatar from a video repository based on the script. In one or more examples, the speech of the avatar comprises background information associated without reciting verbatim the textual content displayed on the page of the user-specific personal assessment report. In one or more examples, the user interface further comprises a navigation region comprising a plurality of topics for navigating to the plurality of static pages.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 1B illustrates exemplary personal metrics associated with a personal assessment questionnaire in accordance with some embodiments of this disclosure.

FIG. 1E illustrates an exemplary user interface for presenting a user-specific personal assessment report in accordance with some embodiments of this disclosure.

FIG. 1F illustrates an exemplary table of text segments in accordance with some embodiments of this disclosure.

FIGS. 2A-2G illustrate exemplary user interfaces for presenting a user-specific personal assessment report in accordance with some embodiments of this disclosure.

FIG. 3 illustrates an exemplary user interface for presenting a user-specific personal assessment report in accordance with some embodiments of this disclosure.

FIG. 4 illustrates an exemplary user interface for presenting a user-specific personal assessment report in accordance with some embodiments of this disclosure.

FIGS. 5A-5C illustrate exemplary user interfaces for presenting a user-specific personal assessment report in accordance with some embodiments of this disclosure.

FIGS. 10A-10B illustrate exemplary user interfaces for presenting a user-specific personal assessment report in accordance with some embodiments of this disclosure.

DETAILED DESCRIPTION

Figure 1A:
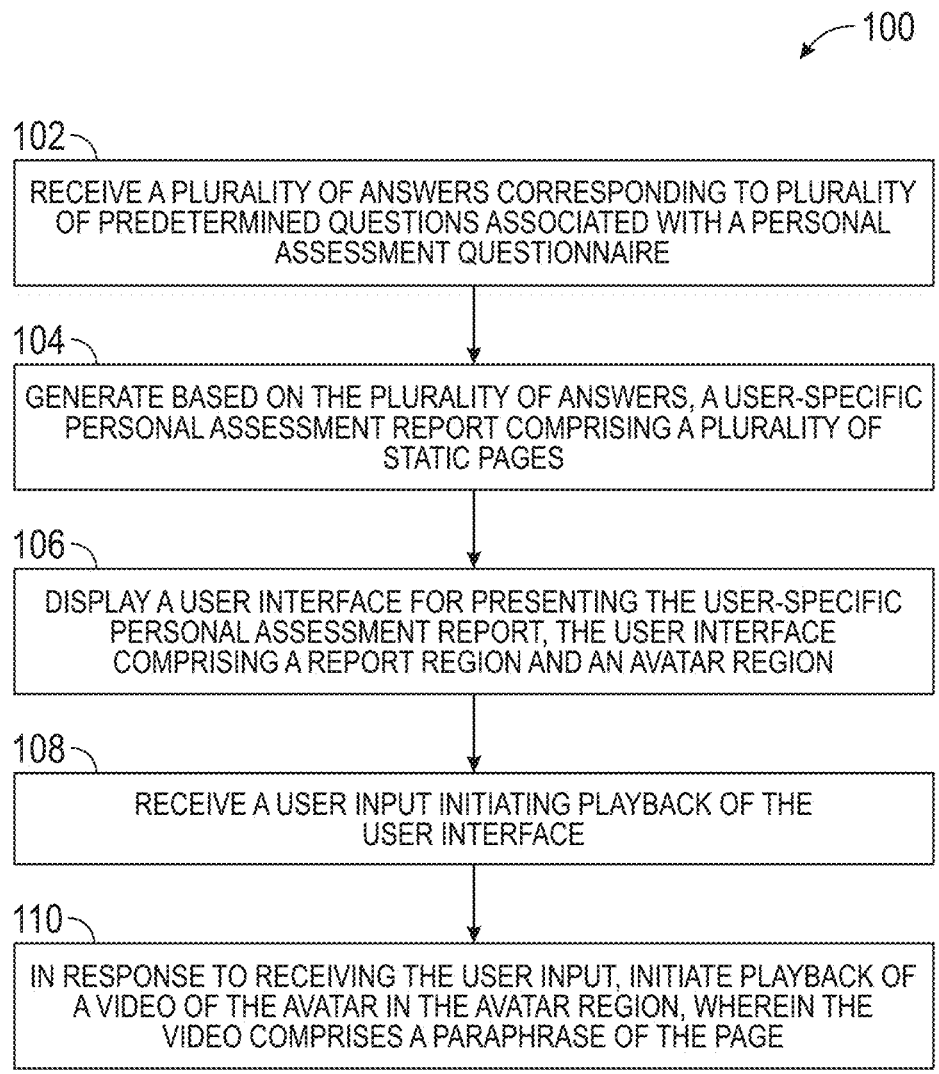
FIG. 1A illustrates an exemplary process for presenting a user-specific personal assessment report in accordance with some embodiments of this disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Personal assessment questionnaires can be used by individuals to identify strengths and weaknesses. Learning about strengths and weaknesses can facilitate personal growth by allowing individuals to harness their strengths and improve upon their weaknesses. For example, employers may distribute assessment questionnaires to employees to facilitate growth and improvement of employees in the workplace. These questionnaires may include a plurality of questions regarding, among other things, traits, competencies, drivers, values, interests, work styles, and work habits, of the employee. The results of the assessment questionnaire can highlight strengths as well as areas of improvement for the employees.

The results of the assessment can be delivered to the individual in a few ways. For example, an individual could conduct a self-review, where the individual reviews a report based on the assessment questionnaire; or the individual may receive one-on-one feedback, where the individual meets with an expert or professional in the field (e.g., a licensed psychologist) who can go over the assessment report with the individual. For individuals who self-review, the individual may not fully comprehend the report or may not be fully engaged with the report. For example, the individual may have questions that are not addressed by the report itself. On the other hand, coordinating and receiving one-on-one feedback can be time consuming and expensive. Accordingly, there is a need to present the results of an assessment report to a user in a relevant and personalized manner to keep the individual engaged and provide information to address questions that may arise.

Embodiments of the present disclosure provide systems and methods for presenting a personalized self-assessment. Personal assessment questionnaires can be salient tools for promoting growth and improvement of an individual by enabling the individual to identify strengths and weaknesses and leverage those strengths and improve upon those weaknesses. Embodiments of the present disclosure can provide a personalized user interface in an intelligent, dynamic, and computationally efficient manner. For example, providing individualized feedback for a report can be computationally expensive, particularly when generating and rendering personalized user interfaces.

For example, embodiments of the present disclosure provide systems and methods that can render personalized user interfaces in a computationally efficient way by, for example, making the graphical user interface more engaging by incorporating animated avatars. In one or more examples, the avatars may be generated using machine-learning techniques. In one or more examples, the avatars can be configured to deliver individualized content that is specific to a user based on the results of the user's personal assessment questionnaire. Conventional methods of implementing graphical user interfaces in this context may not incorporate avatars and/or deliver the same animated content to multiple users.

Embodiments of the present disclosure can further provide systems and methods for efficiently retrieving the avatar content. For example, the avatar content can be obtained from a video repository dynamically based on user-specific settings. In one or more examples, the avatar content can be pre-generated and stored in the video repository. In this manner, systems and methods of the present disclosure can reduce the processing power, memory usage, and power consumption associated with generating individualized videos for specific users while providing user-specific feedback.

Embodiments of the present disclosure can further provide systems and methods for efficiently rendering the avatar. For example, the avatar can be automatically overlaid onto static pages of a report at an appropriate location. In this manner, the system can provide an engaging and personalized user interface without requiring excessive processing power and memory usage associated with presenting a user interface associated with the report and a separate user interface associated with the avatar. Such techniques further ensures that the content presented on the report is synced with the speech delivered by the avatar, such that the avatar is discussing the content currently displayed by the report.

FIG. 1A illustrates a flow chart of a process 100 for presenting a user-specific personal assessment report in accordance with embodiments of the present disclosure. Process 100 is performed, for example, using one or more electronic devices implementing a software platform. In some examples, process 100 is performed using a client-server system, and the blocks of process 100 are divided up in any manner between the server and a client device. In other examples, the blocks of process 100 are divided up between the server and multiple client devices. In other examples, process 100 is performed using only a client device or only multiple client devices. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

At Block 102 of FIG. 1A, the system can receive a plurality of answers corresponding to plurality of predetermined questions associated with a personal assessment questionnaire. For example, as discussed above, an individual (e.g., user) may access and complete a personal assessment questionnaire. The personal assessment questionnaire can include a plurality of predetermined questions regarding various personal metric categories, including but not limited to, traits, competencies, drivers, values, interests, work styles, and work habits.

For example, the personal assessment questionnaire can comprise a plurality of questions to evaluate one or more behavioral competencies, one or more user traits, and one or more drivers. FIG. 1B illustrates the exemplary personal metrics that can be included in a personal assessment questionnaire 120. As shown in the figure, the personal assessment questionnaire can include questions related to personal metric categories of behavioral competencies, traits, and drivers.

For example, behavioral competencies can include observable skills and behaviors that are associated with success. Such behavioral competencies can shape how an individual performs at their job and how the individual accomplishes goals. For example, the plurality of questions can be associated with behavioral competencies including, but not limited to, builds networks, interpersonal savvy, persuades, drives results, collaborates, plans and aligns, instills trust, communicates effectively, manages ambiguity, strategic mindset, balances stakeholders, decision quality, customer focus, global perspective, and action oriented.

Traits can include personal characteristics that exert a strong influence on behavior. In one or more examples, particular traits may be more salient to some roles than others, for example certain traits may be more salient to a manager role than an associate role. In one or more examples, the plurality of questions in the personal assessment questionnaire can be associated with exemplary traits, including but not limited to, focus, situational self-awareness, assertiveness, adaptability, need for achievement, humility, tolerance of ambiguity, sociability, composure, risk-taking, optimism, persistence, affiliation, trust, credibility, curiosity, and empathy.

Drivers can include preferences, values, and motivations that influence an individual's aspirations. In one or more examples, the plurality of questions in the personal assessment questionnaire can be associated with exemplary drivers can include but not limited to, structure, independence, balance, collaboration, challenge, and power.

In one or more examples, the answers to the questions may be received as a number (e.g., a rating on a scale of 1 to 5, a rating on a scale of 1 to 10, etc.) or a binary value (e.g., yes or no, true or false, etc.). The value type associated with the answer is not intended to limit the scope of the disclosure.

In one or more examples, the personal assessment can be administered by the system on behalf of one or more clients, e.g., companies. In such examples, the personal assessment can be tailored based on particular traits, competencies, drivers, characteristics, values, interests, work styles, and work habits associated with one or more companies. In this manner the system is not limited to receiving the same personal assessment questionnaire type, e.g., a personal questionnaire that includes the same questions. Rather the system is able to receive and provide feedback for a variety of personal questionnaire types.

Figure 1C:
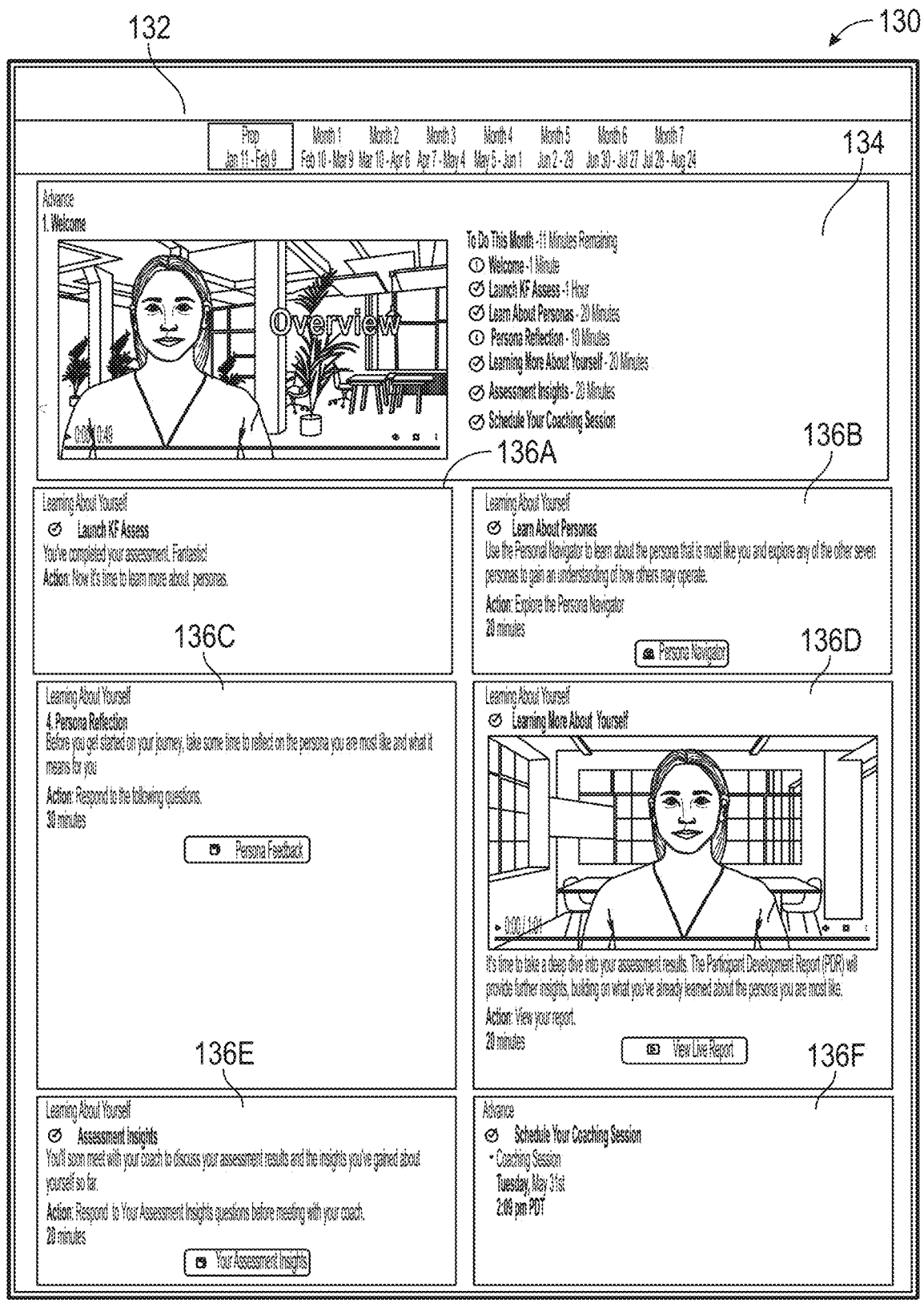
FIG. 1C illustrates an exemplary user interface for presenting a user-specific personal assessment report in accordance with some embodiments of this disclosure.

In one or more examples, the system can present a user interface that allows a user to access the personal assessment. FIG. 1C illustrates an exemplary user interface 130 according to embodiments of this disclosure. In one or more examples, user interface 130 may be used to access the personal assessment questionnaire as well as the results, i.e., the user-specific personal assessment report. As shown in the figure, the user interface 130 can include a navigation region 132, a task list region 134, and a plurality of tasks 136A-136F based on the task list.

The navigation region 132 can comprise a plurality of user affordances corresponding to a plurality of modules. As shown in the figure the navigation region includes a plurality of monthly modules that may be associated with the personal assessment questionnaire and presentation of the user-specific personal assessment report. The system can navigate between the modules by receiving an input from a user indicating a selection of one of the modules and present the corresponding module.

As shown in user interface 130, the task list region 134 can include a welcome video that provides an overview for of the personal assessment questionnaire and a list of associated tasks for the user to complete. The system can display a task to the user in response to receiving an input from a user that the user has selected a corresponding task. As shown in the figure, task 136A may be associated with a personal assessment questionnaire, task 136B may be associated with a persona tutorial, task 136C may be associated with a persona reflection, task 136D may be associated with presentation of the user-specific personal assessment report, task 136E may be associated with a reflection on the user-specific personal assessment report, and task 136F may be associated with scheduling a coaching session.

In one or more examples, selecting a user affordance associated with a task may cause the system to present the task to the user. For example, the system can receive an indication that a user has selected a user affordance associated with task 136D. In one or more examples, the user affordance may correspond to a button or link. In response, to receiving the user input (e.g., selection of the user affordance associated with a task), the system can present a user interface associated the respective task. For example, with respect to task 136D, the system can display a user interface for presenting the user-specific assessment report. In one or more examples, once a user has completed a particular task, the system may no longer display the user affordance. For example, task 136A indicates that the user has completed the personal assessment questionnaire.

At Block 104 of FIG. 1A, the system can generate based on the plurality of answers, a user-specific personal assessment report comprising a plurality of static pages. For example, the system can evaluate the individual answers provided by the user to generate a score for the user for each of the personal metrics included in the questionnaire based on the answers provided by the user. The scores for the various personal metrics can then be used to generate a user-specific personal assessment report.

For example, referring to the exemplary personal assessment questionnaire described in FIG. 1B, each of the questions may be associated with one of the personal metrics in a respective personal metric category (e.g., behavioral competencies, traits, or drivers). As an example, one or more of the questions may be associated with the "collaborates" behavioral competency. At block 104, the system can process the answers associated with a particular personal metric to determine a score. For example, the system can process the "collaborates" behavioral competency to generate a score.

In one or more examples, if the answers are associated with a numeric value, an average of the answers can be taken to determine the score. In one or more examples, if the score is associated with a binary value, a sum of the "yes" or "1"

values can be used to determine the score. A skilled artisan will appreciate other methods of determining the score can be used without departing from the scope of this disclosure. For example, a score may be determined as an absolute percentage. A score can be determined for each of the personal metrics (e.g., builds networks, interpersonal savvy, persuades, etc.) included in the questionnaire. In one or more examples, the score for a personal metric may be determined by questions associated with different types of scores (e.g., binary value, numeric value, etc.). In such examples, the score may be determined as an absolute percentage.

Figure 1D:
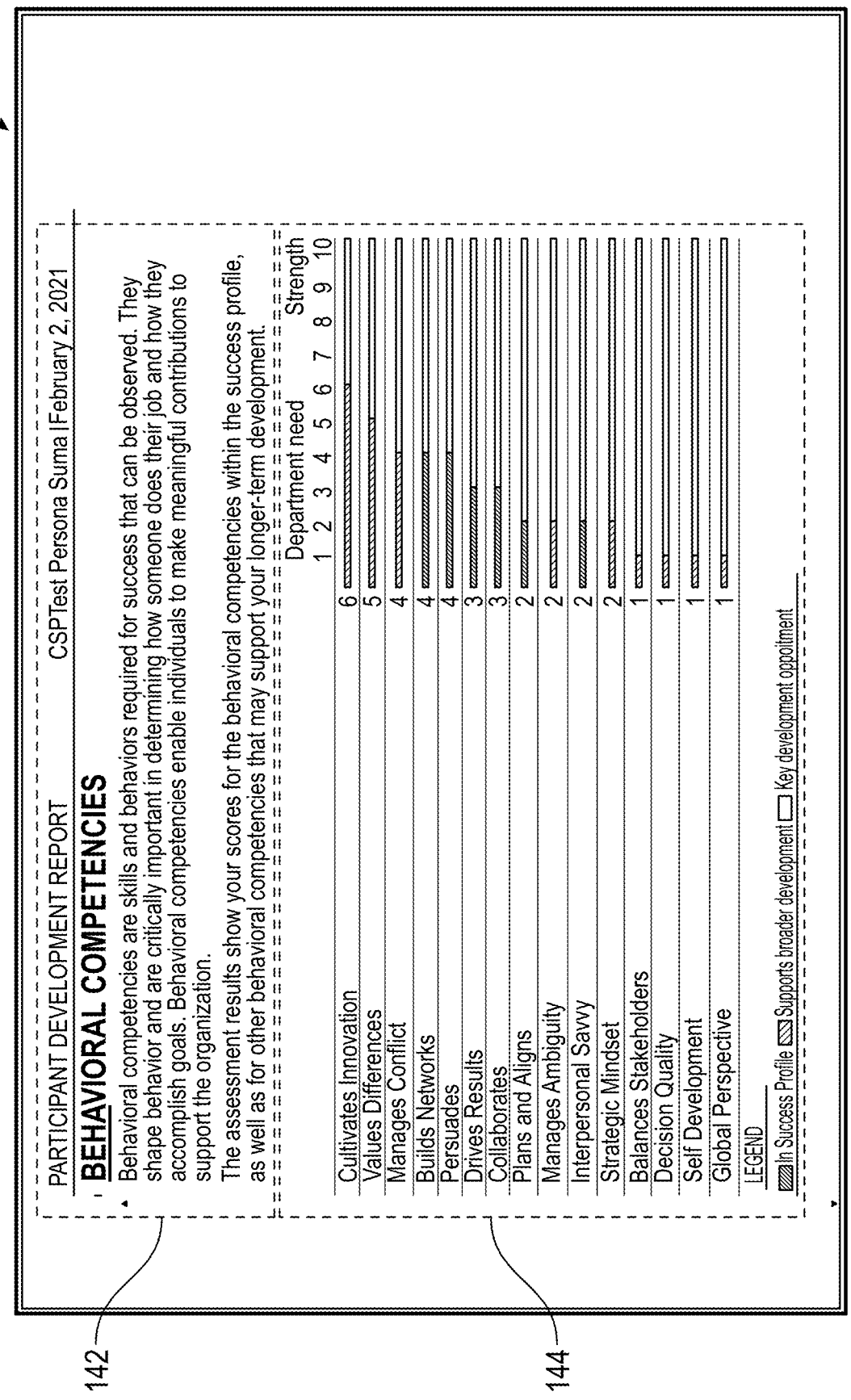
FIG. 1D illustrates an exemplary user-specific personal assessment report in accordance with some embodiments of this disclosure.

FIG. 1D illustrates an exemplary page 140 from a user-specific personal assessment report. As shown in the figure, the user-specific personal assessment report can include a summary of the results of the personal assessment. In one or more examples, the summary of the results can include a visual representation of the scores associated with each of the personal metrics as well as descriptive content summarizing the personal metric category.

As shown in FIG. 1D, the page 140 includes a descriptive summary section 142 and a score summary section 144. The descriptive summary section 142 can provide a high level summary of the particular personal metric category, in this case behavioral competencies. The score summary section can summarize the scores for each of the behavioral competencies (e.g., cultivates innovation, values differences, builds networks, persuades, drives results, collaborates, plans and aligns, manages ambiguity, interpersonal savvy, strategic mindset, balances stakeholders, decision quality, self development, and global perspective). The bar plot format of the score summary section 144 is exemplary and other formats for representing the scores and corresponding personal metrics can be used without departing from the scope of this disclosure. Page 140 is exemplary and additional personal metrics or less personal metrics can be used without departing from the scope of the disclosure.

The report can further include additional pages related to other personal metric categories, e.g., traits, drivers, etc. The report can further include additional explanatory pages related to explaining and/or summarizing the contents of the report and how the report may be used by the individual.

At Block 106 of FIG. 1A, the system can display a user interface for presenting the user-specific personal assessment report. In one or more examples, the user interface can include a report region and an avatar region. For example, as described above with respect to user interface 130, a user interface for presenting the user-specific personal assessment report may be displayed in response to receiving a user input.

Figure 1E:
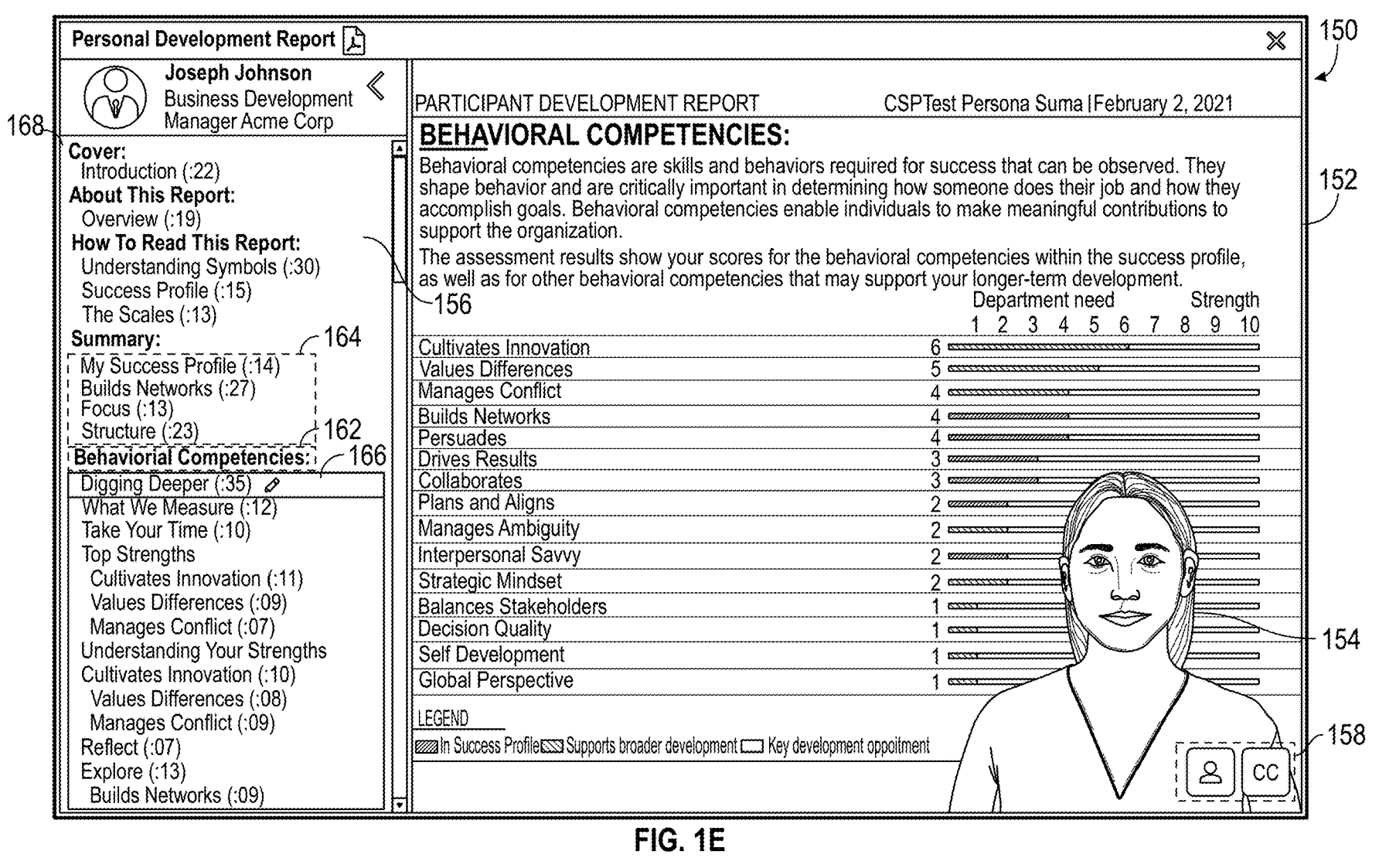

FIG. 1E illustrates an exemplary user interface 150 for presenting the user-specific personal assessment report. As shown in the figure, the user interface 150 can include a report region 152, an avatar region 154, a navigation region 156, and one or more user affordances 158. As shown in the figure, the avatar region 154 can be, at least partially overlaid on the report region 152.

Figure 2A:
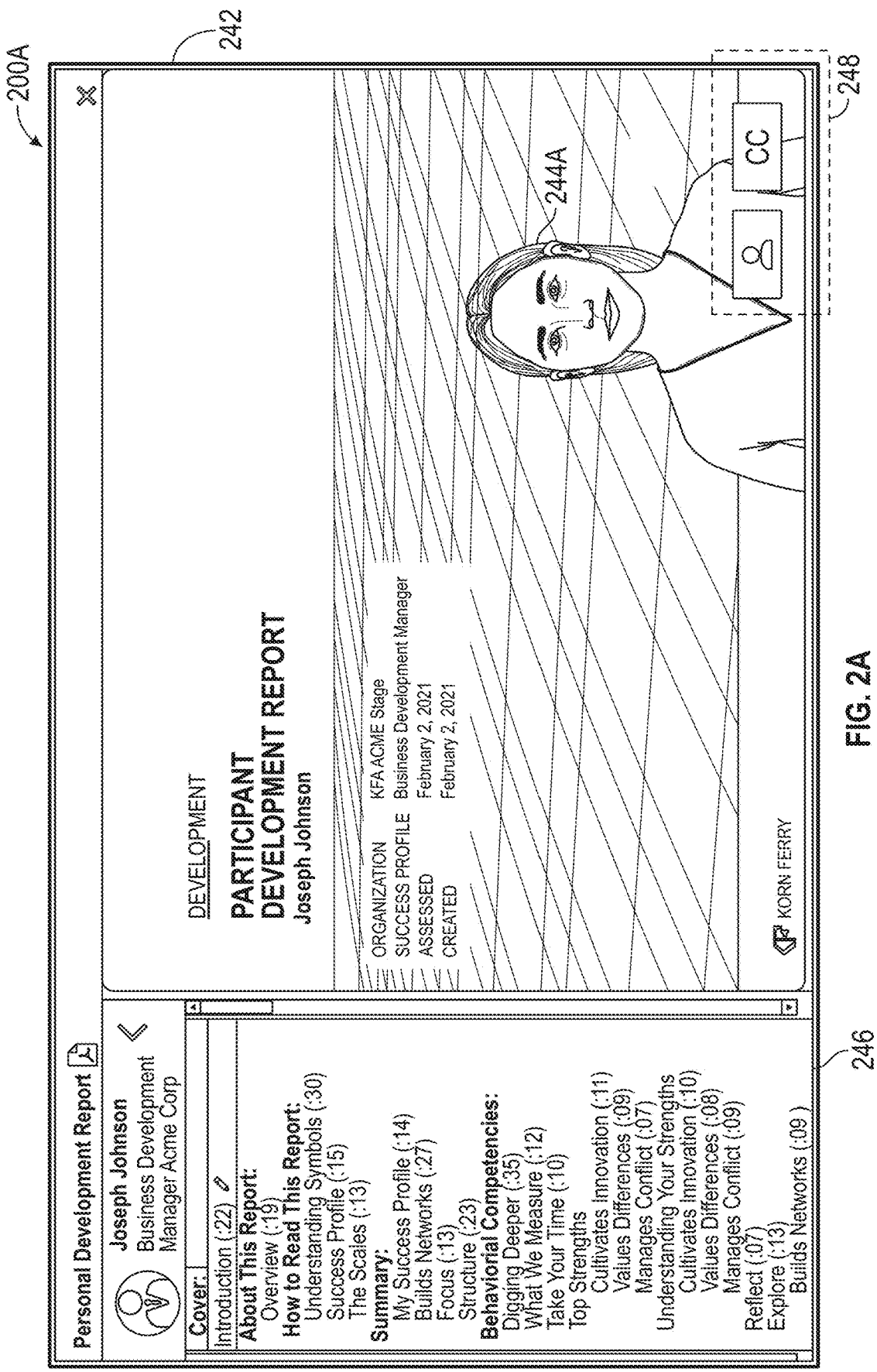

In one or more examples, the navigation region 156 can provide a table of contents for the presentation of the user-specific personal assessment report. As shown in the figure, the navigation region 156 can include a plurality of topics (e.g., About This Report, How to Read This Report, Summary, Behavioral Competencies, etc.) and for each topic, one or more subtopics related to a respective topic. For example, as shown in the figure, the Summary topic 162 includes one or more subtopics 164, e.g., My Success Profile, Builds Networks, Focus, and Structure. In one or more examples, each topic can be associated with a different page of the user-specific personal assessment report. For example, the page for the Behavioral Competencies displayed in the report region 152 may be different from the page for the About This Report topic displayed in the report region, as shown in FIG. 2A.

In one or more examples, each subtopic associated can be associated with a video or video segment presented in the avatar region 154. The video or video segment can include an avatar presenting speech related to the respective subtopic. For example, the video displayed in avatar region 154 may correspond to the Digging Deeper subtopic 166 highlighted in the navigation region 156.

In one or more examples, a user can navigate the topics and subtopics of the presentation of the user-specific personal assessment report using the navigation region 156. For example, the system can receive an indication from a user input device that the user has selected a particular topic or subtopic. In such examples, the presentation of the user-specific personal assessment report can jump to the corresponding page of the user-specific personal assessment report and the corresponding video associated with the selected topic or subtopic.

In one or more examples, the navigation region may include an indication of a user's progress through the table of contents, e.g., whether a particular topic or subtopic has played. For example, a vertical bar 168 next to the right of a topic or subtopic may be highlighted or colored-in once a topic or subtopic has played. In this manner, the system can provide a visual indication tracking which portions of the presentation of the user-specific personal assessment the user has reviewed. In one or more examples, this tracking information may be provided to a client or company that has distributed the personal assessment to the user.

In one or more examples, the report region 152 can be generated based on one or more images of the pages included in the report. For example, if the pages of the report are generated in a pdf format, the system can convert each of the pages of the pdf into an image format and thus a static page. In one or more examples, the report region can correspond to an image of the user-specific personal assessment report. In one or more examples, the report region can correspond to a video of the user-specific personal assessment report. In one or more examples, the report region may include interactive forms, surveys, or questions that can receive a user input. In such examples, the user input may adjust one or more user interfaces, video content, and/or the order of the presentation of the one or more topics and subtopics displayed in the navigation region.

In one or more examples, the avatar region 154 can comprise a video or a video segment that presents the avatar speaking about the contents on the page displayed in the report region 152. That is, the video presented in the avatar region 154 can be associated with the page of a user-specific personal assessment report displayed in the report region 152. In one or more examples, the speech of the avatar may be a paraphrase and not a verbatim presentation of the text included in the report region. In other words, in such embodiments, the avatar may not merely read the text displayed in the report region 152. In one or more examples, the avatar may further describe the contents of the page and provide background information associated with contents of the page displayed in the report region. In such embodiments, the speech of the avatar may be tailored to anticipate and address frequently asked questions regarding the contents of the page.

In one or more examples, multiple videos or multiple video segments of the avatar can be associated with a single page of the user-specific personal assessment report. In one or more examples, each video presented in the avatar region may correspond to a respective subtopic. For example, with respect to the Behavioral Competencies topic 162, the avatar region 154 can display videos associated with each of the subtopics 164 (e.g., Digging Deeper, What We Measure, Take Your Time, Top Strengths, Cultivates Innovation, Manages Conflict, etc.).

In one or more examples, the system can select the one or more videos for playback in the avatar region based on the user-specific personal assessment report. For example, in some embodiments, the system can select one or more videos to be presented to a user via the user interface 150 based on the scores determined for the user-specific personal assessment report. In one or more examples, the system can select the videos from a repository of a plurality of videos. In one or more examples, the system can generate a script for the videos based on the scores determined for the user-specific personal assessment report. Additional information regarding producing the videos is discussed later in the application.

The user interface 150 can further include one or more user affordances 158. As shown in the figure, the one or more user affordances 158 can include a closed captioning user affordance and an avatar display user affordance. In one or more examples, selecting the closed captioning user affordance can turn closed captioning off and on. In one or more examples, selecting the avatar display user affordance may cause the system to stop displaying the avatar, however, the audio associated with the avatar video can continue to play. For example, selecting the avatar display user affordance can set the layer comprising the avatar to be transparent, thereby still allowing the audio associated with the video to continue to play.

At Block 108 of FIG. 1A, the system can receive a user input initiating playback of the user interface. For example, the system can receive an input from the user (e.g., via a user input device such as a mouse or touch pad) indicating that the user has clicked on the user interface 150. In one or more examples, a user can click any region in the user interface 150 to initiate playback. In one or more examples, a user can click any region in the user interface 150, excluding the navigation region 156, to initiate playback. In one or more examples, a user affordance (e.g., a play button) can be provided and playback may begin once the user selects the play button.

In one or more examples, to pause playback, the user can click in any region in the user interface, excluding the navigation region 156. In one or more examples, a user affordance (e.g., a pause button) can be provided to pause playback.

At Block 110 of FIG. 1A, the system can initiate playback of a video of the avatar in the avatar region in response to receiving the user input. In one or more examples, the speech of the avatar can include a paraphrase of the content displayed on the page. In such examples, the speech of the avatar may not be verbatim presentation of the text included in the report region, e.g., the avatar may not merely read the text displayed in the report region. In one or more examples, the speech of the avatar can further include background information associated with the content displayed on the page. In one or more examples, the avatar may further provide an analysis of the contents of the page. In such embodiments, the speech of the avatar may be tailored to anticipate and address frequently asked questions regarding the contents of the page.

In one or more examples, once a user has initiated playback of the user interface, e.g., user interface 150, the system may automatically progress through the table of contents displayed in the navigation region 156. In such examples, the navigation region may include an indicator 166 that highlights currently presented subtopic in the navigation region 156 to show the user's progression through the presentation of the user-specific personal assessment report. In one or more examples, the system can receive a selection of a topic or subtopic from the navigation region and navigate to the user interface associated with the selection. In one or more examples, the system may include a plurality of videos, (with or without the presence of the avatar or page background) when a topic or subtopic is auto navigated to or selected from the table of contents of the navigation region.

As discussed above, user interface can present a plurality of videos of the avatar. In one or more examples, the videos can be pre-generated and stored in a video repository such that once the system generates the user-specific personal assessment, the system can select the appropriate videos to be presented in the user interface.

In one or more examples, the videos can be generated on based on a plurality of predefined text segments based on the possible results of the personal assessment questionnaire. In one or more examples, the system can use information previously known by the system about the individual (e.g., user role, user responsibilities, and/or preferences) used in combination with the scores from the personalized assessment to further tailor the videos.

In one or more examples, each of the personal metrics included in the presentation of the user-specific personalized assessment report can be associated with a plurality of predefined text segments, where each predefined text segment is associated with a user score. In one or more examples, the score may be categorized as a high score or a low score and one or more text segments may be associated with each categorization. For example, if a score is associated with a range of values (e.g., 0-5), a score below a first threshold (e.g., 2.5) may be considered a low score and a score above the first threshold (e.g., 2.5) may be considered a high score. A different text segment may be associated with the high score and the low score. In one or more examples, the score may be categorized as a high score, a medium score, or a low score. For example, if a score is associated with an absolute percentage, a score below a first threshold (e.g., 30%) may be considered a low score, a score between the first threshold and a second threshold (e.g., between 30% and 70%) may be considered a medium score, and a score above the second threshold (e.g., 70%) may be considered a high score. A different text segment may be associated with the high score, the medium score, and the low score. These ranges and thresholds provided are exemplary and not intended to limit the scope of the disclosure.

For example, referring to FIG. 1F a table 160 of exemplary text segments are shown. As shown in the table 160, each of the subtopics or in this case, each of the personal metrics may be associated with multiple text segments based on whether a user achieved a high score or low score for a particular personal metric. For example the Navigate Change personal metric may be associated with a background text segment, a high text segment (e.g., associated with a high score), and a low text segment (e.g., associated with a low score). In one or more examples, additional text segments may be included, e.g., a medium text segment (e.g., associated with a medium score) and/or text segments specific to a user's role, position, or preferences.

In one or more examples, the system can further associate a text segment for a specific metric based on a score and based on a user's role, position, or preferences. For example, the system can determine whether the personal metric (e.g., Navigate Change) is high, medium or low scoring and determine whether the score associated with the personal metric is appropriate for the user's role, below the appropriate level for the user's role, or above the appropriate level for the user's role. In such examples, the system may generate nine different paragraphs for each combination of the score (e.g., high, medium, and low) and the appropriate level for a particular role (e.g., level is met, level is exceeded, level is below). For example, a first user with a manager role that achieves a high score for Navigates Change may receive one or more first text segments, while a second user with a director role that achieves a high score for Navigates Change may receive one or more second text segments. In some examples, some of the first text segments and the second text segments may be the same, e.g., related to background and the high score, but text segments associated with the user's role may differ. In this manner the system can use information about the individual (e.g., role, responsibilities, and preferences) in addition to the personal assessment questionnaire to tailor the videos to the user to provide an individualized experience for the user.

The videos may be produced using machine learning, deep learning, neural networks and the like as well as natural language processing. In some examples, one or more machine-learning models can be configured to receive desired attributes of an avatar (e.g., appearance, emotions, etc.) and/or desired speech output (e.g., one or more textual segments, high-level summary of the content to be conveyed) and output video data including a generated avatar providing speech. In some examples, the one or more machine-learning models can be configured to receive user-specific information from assessment (e.g., a user's score in a particular category) and output video data including a generated avatar providing an audio explanation of the user-specific information.

The one or more machine-learning models may be trained using one or more machine learning techniques, e.g., artificial neural network, convolutional neural network deep neural network, and the like, to generate a synthetic face corresponding to the avatar. In one or more examples, the machine learning models can be trained based on a plurality of facial videos of pre-defined facial emotion expressions and/or a plurality of facial video corresponding of pre-defined speech segments. In one or more examples, the training may be supervised or unsupervised. In one or more examples, an initial model can be retrained and/or refined based on additional training data, e.g., a plurality of facial videos of pre-defined facial emotion expressions and/or a plurality of facial video corresponding of pre-defined speech segments. In one or more examples, the machine learning model can be initially trained using supervised methods and retrained using unsupervised methods.

In one or more examples, the machine learning model may be trained to receive one or more input images corresponding to the appearance of the avatar as well as a textual segment and output a video of an avatar delivering the textual segment as speech. In one or more examples, the machine learning model may be trained to receive one or more input images corresponding to the appearance of the avatar and one or more results of a personal assessment questionnaire (e.g., a score), and output a video of an avatar delivering the results of the personal assessment questionnaire.

Figure 1G:
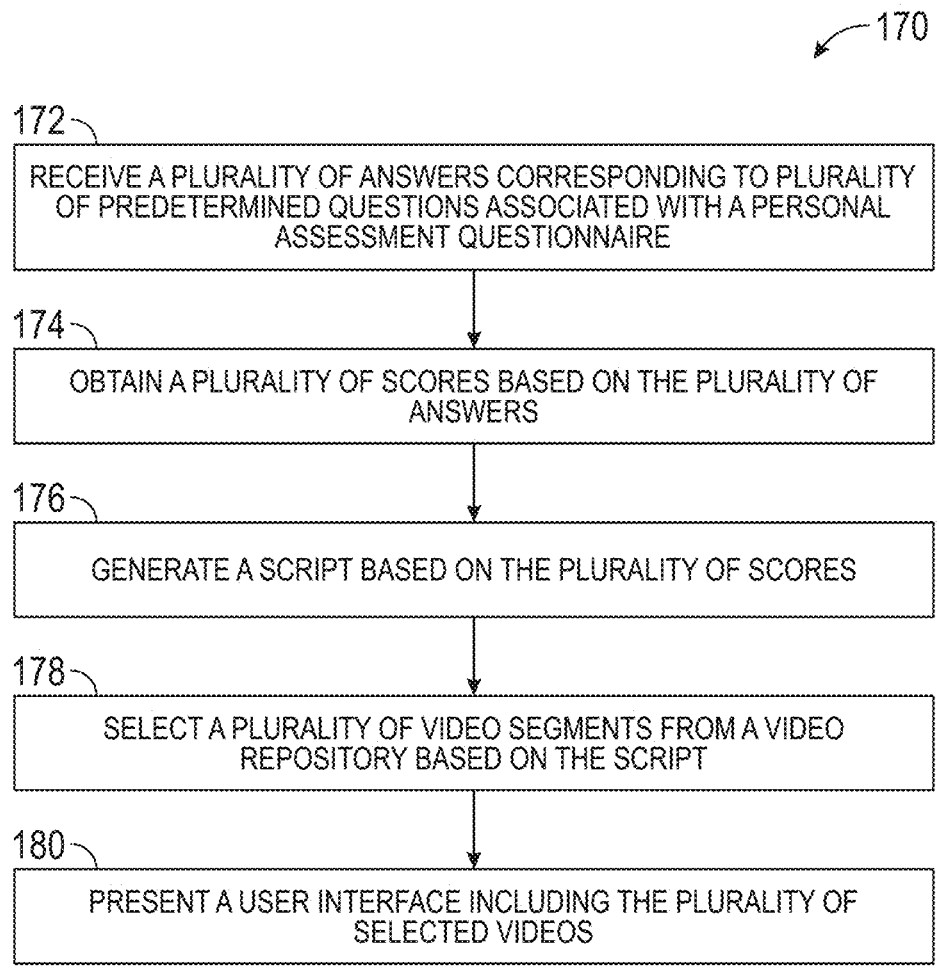
FIG. 1G illustrates an exemplary process for presenting a user interface including a plurality of videos in accordance with some embodiments of this disclosure.

FIG. 1G illustrates a process 170 for presenting a video in the avatar region of a user interface. At Step 172, the system can receive a plurality of answers corresponding to plurality of predetermined questions associated with a personal assessment questionnaire. Step 172 can be similar to step 102 of FIG. 1A. At step 174, the system can obtain a plurality of scores based on the plurality of answers. Step 174 can be associated with step 104 of FIG. 1A.

At step 176, the system can generate a script based on the plurality of scores. For example, the system can select one or more speech segments based on the score achieved by the user associated with a particular personal metric. For example, with reference to table 160, if a user achieved a high score in the Navigate Change personal metric, the system may select the high text segment (e.g., "you may tend to explore new possibilities, take ideas from vision to reality, and lead others through change"). Alternatively, if a user achieved a low score in the Navigate Change personal metric, the system may select the high text segment (e.g., "you may tend to favor proven ways to work, rather than change your approach or test new ideas"). In this manner the system can generate a script that is individualized and tailored to a particular user in a dynamic manner.

At step 178, the system can select a plurality of video segments from the video repository based on the script. By selecting pre-generated videos from the repository, the system can generate content for presentation of the user-specific personal assessment in a dynamic and efficient manner that is computationally inexpensive and thereby reduce memory and power consumption.

At step 180, the system can present a user interface including the plurality of selected videos. The process of presenting the user interface can correspond to one or more steps associated with process 100 described in FIG. 1A.

In this manner, the presentation of content for a particular user can be individualized and tailored to a user based on the user-specific personal assessment report (e.g., scores based on the personal assessment questionnaire). For example, no two users should receive the same feedback based on the report unless the users provided identical answers to the report and are in identical roles.

FIGS. 2A-2G illustrate exemplary user interfaces in accordance with some embodiments of the disclosure. For example, FIGS. 2A-2G can include a report region 242, an avatar region 244A and 244B, a navigation region 246, and a plurality of user affordances 248. The report region 242, an avatar region 244, a navigation region 246, and a plurality of user affordances 248 can be similar to the corresponding regions described in FIG. 1D. The user affordances can include an avatar display user affordance, a closed captioning user affordance. As shown in at least FIG. 2B, the user affordances can also include a playback user affordance.

As shown in FIG. 2A, the avatar region 244A can include a video of an avatar. In one or more examples, the video of the avatar can be placed on a transparent background. As discussed above, in one or more examples, the avatar region 244A may partially overlap with the report region 242. Overlaying the avatar region 244A, at least partially, on the report region 242 may aid in keeping the user's attention focused on the report region 242 as the video in the avatar region 244A is played back.

In some examples, overlaying the avatar region 244A on the report region 242 may obstruct some of the content displayed by the page of the user-specific assessment report. In some examples, overlaying a video of an avatar with a transparent background on the report region 242 can create an impression that the avatar is integrated with the report. In some examples, the transparent background can reduce the amount of information or content obstructed by the avatar region 244A.

Figure 2B:
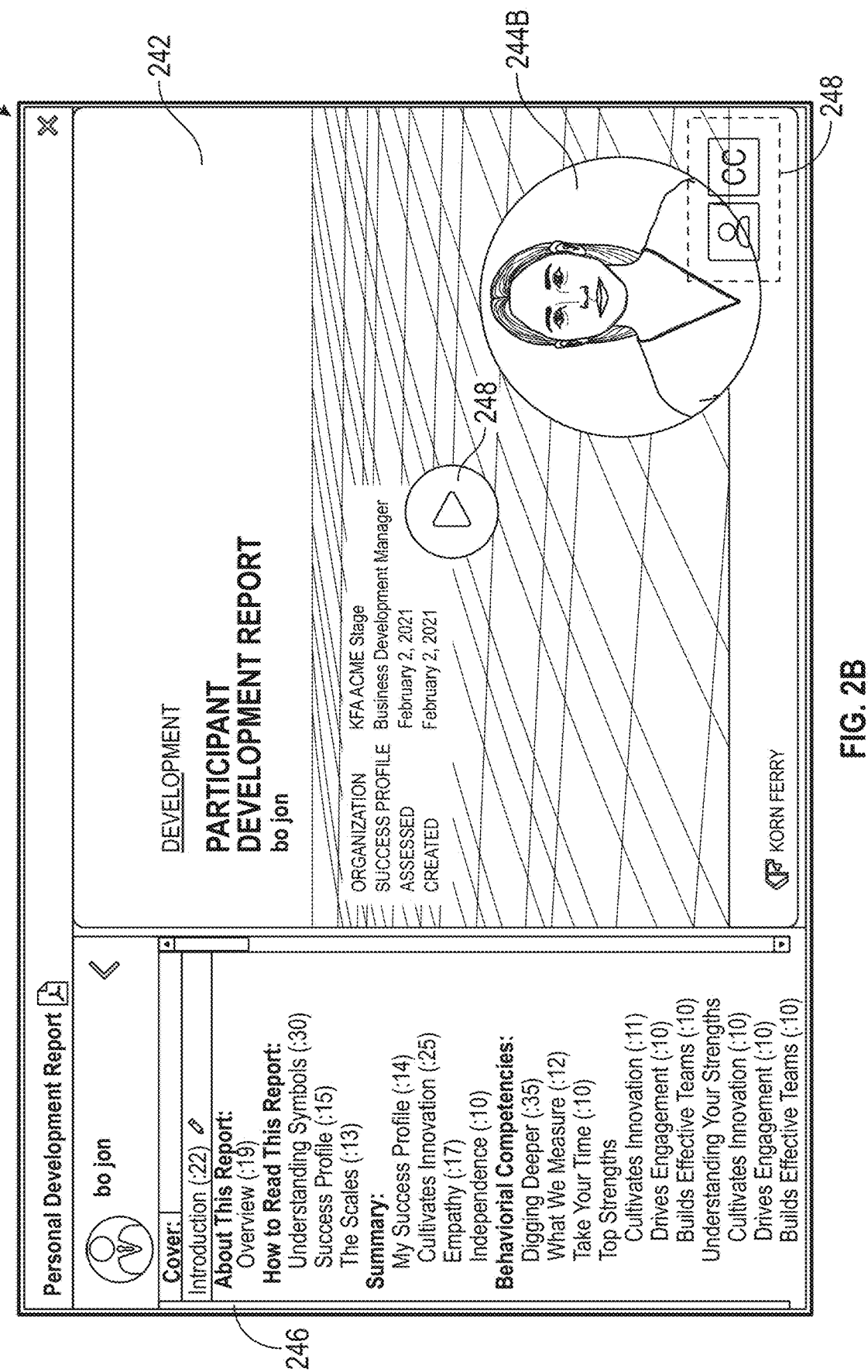
Figure 2C:
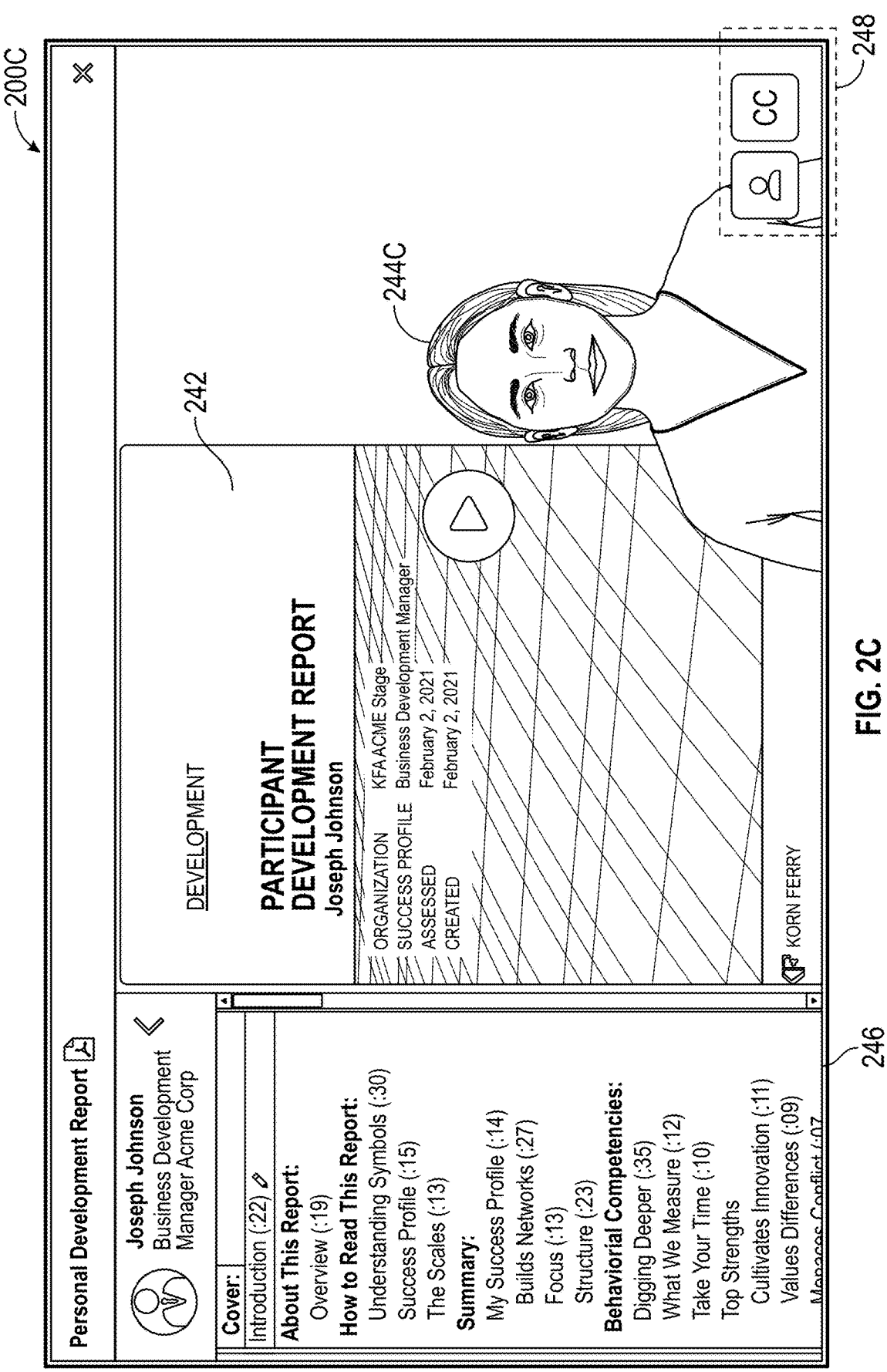

In some examples, the size of the avatar can be adjusted to reduce the amount of information or content obstructed by the avatar region 244A. For example, as shown in FIG. 2B, the avatar in the avatar region 244B is smaller than the avatar in avatar region 244A. Additionally, as shown in the user interface 200B, the video of the avatar may be overlaid on a non-transparent shape, e.g., circle, rectangle, oval, etc., instead of a transparent background. In one or more examples, the non-transparent shape can include attention-getting shapes such as arrows, stars, and the like, that may draw attention to the content of the avatar's speech. In such examples, the non-transparent shape may highlight the location of the avatar region 244B. A skilled artisan will understand that the specific shape and the specific color or background of the non-transparent shape does not limit the scope of this disclosure.

In one or more examples, the system can receive an indication that the user has resized the window of the user interface, e.g., user interface 200A. For example a user may use a cursor to drag a corner of a window to enlarge or shrink the window of the user interface. In one or more examples, the report region 242, the navigation region 246, and the avatar region 244A-244D may be resized automatically based on the indication that the user has resized the window.

In one or more examples, the user interface the amount of overlap may change as a user resizes the window. For example, the system can receive an indication from a user to resize the user interface 200A to the user interface 200C. As seen from the figures, as the window size of the user interface is adjusted, the amount of overlap between the report region 242 and the avatar region 244A is greater than the amount of overlap between the report region 242 and the avatar region 244C. As another example, the system can receive an indication from a user to resize the user interface 200C to the user interface 200D. As seen from the figures, as the window size of the user interface is adjusted, the amount of overlap between the report region 242 and the avatar region 244C is greater than the amount of overlap between the report region 242 and the avatar region 244D.

Figure 2E:
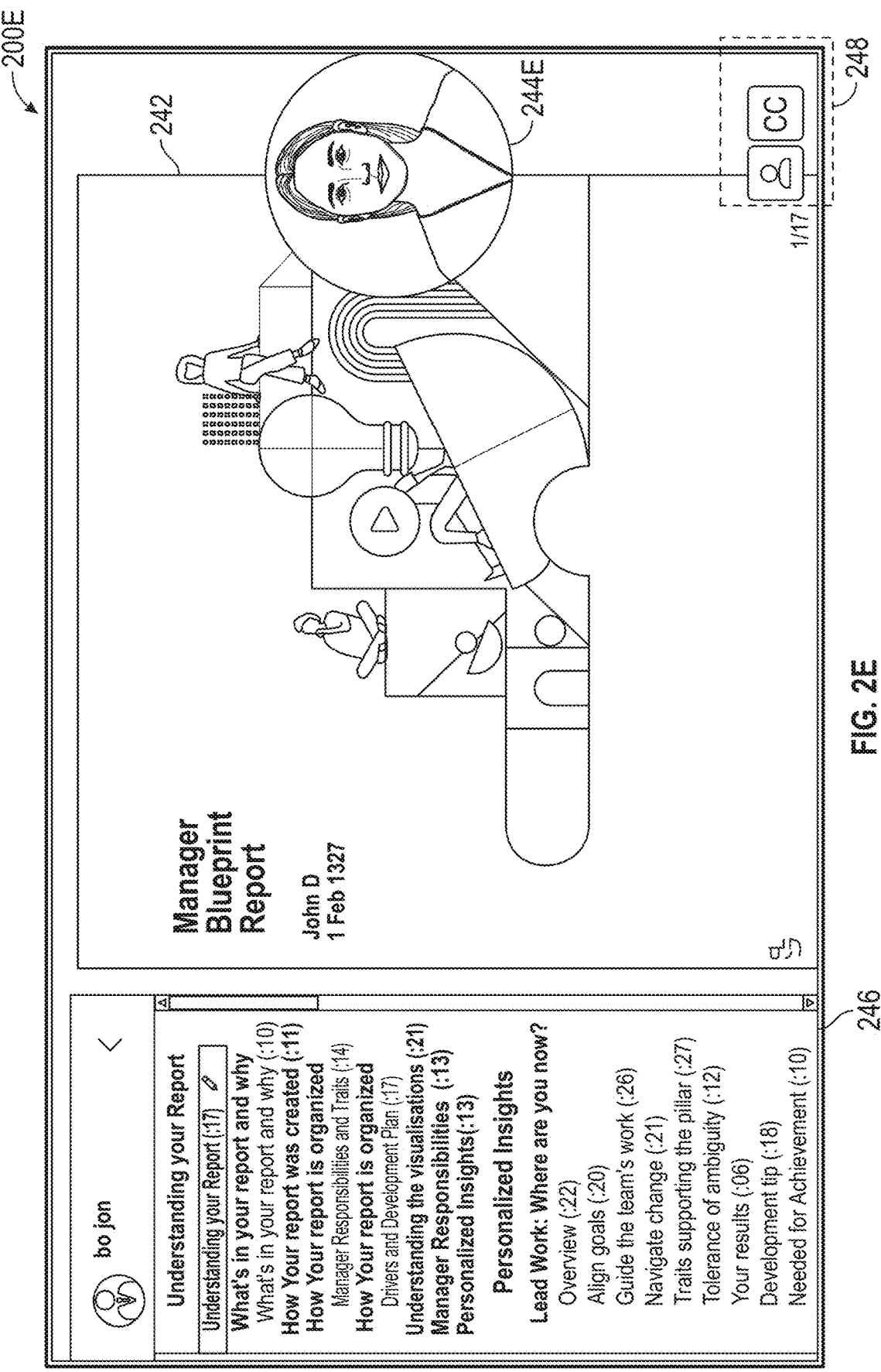
Figure 2F:
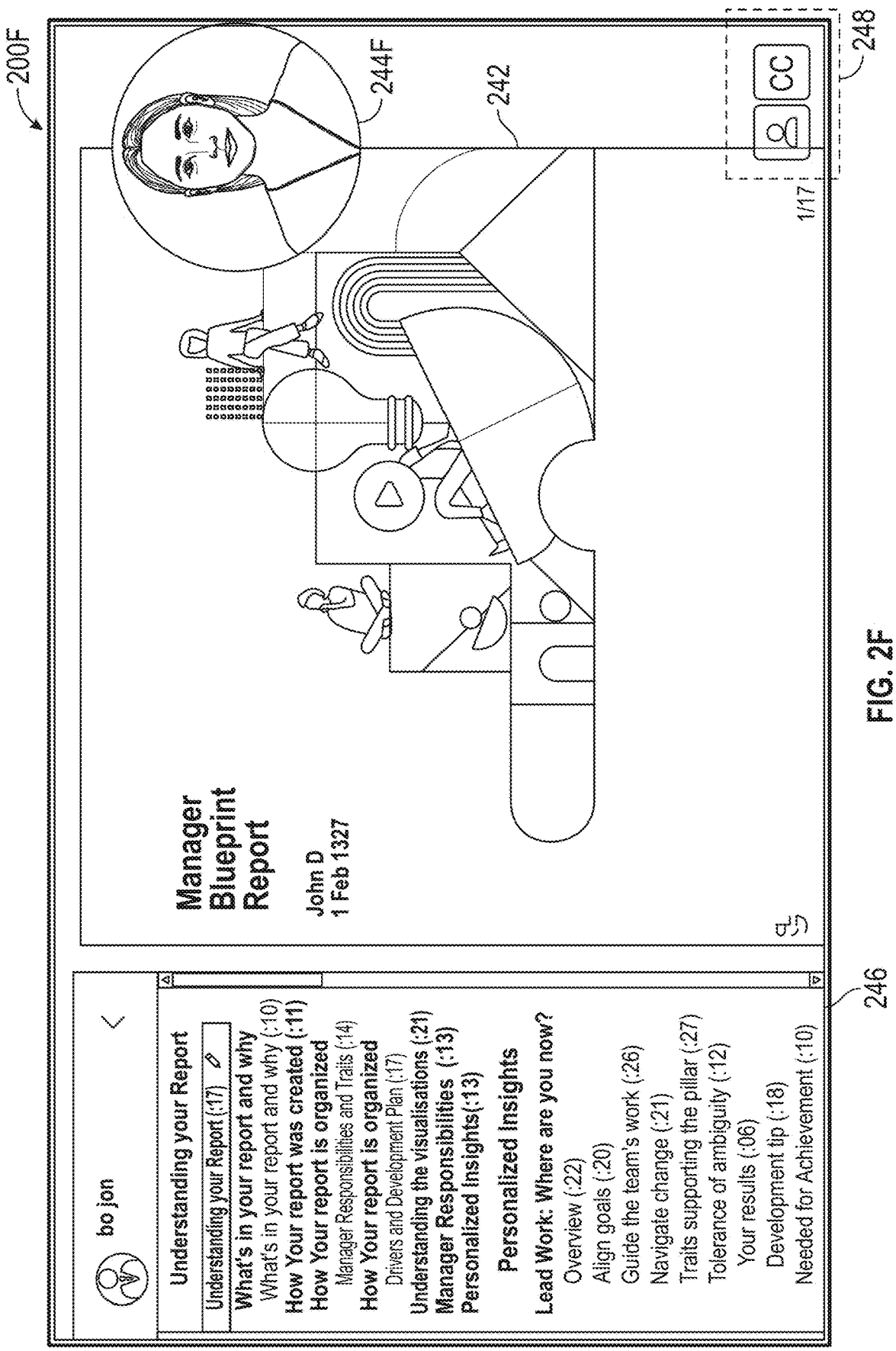
Figure 2G:
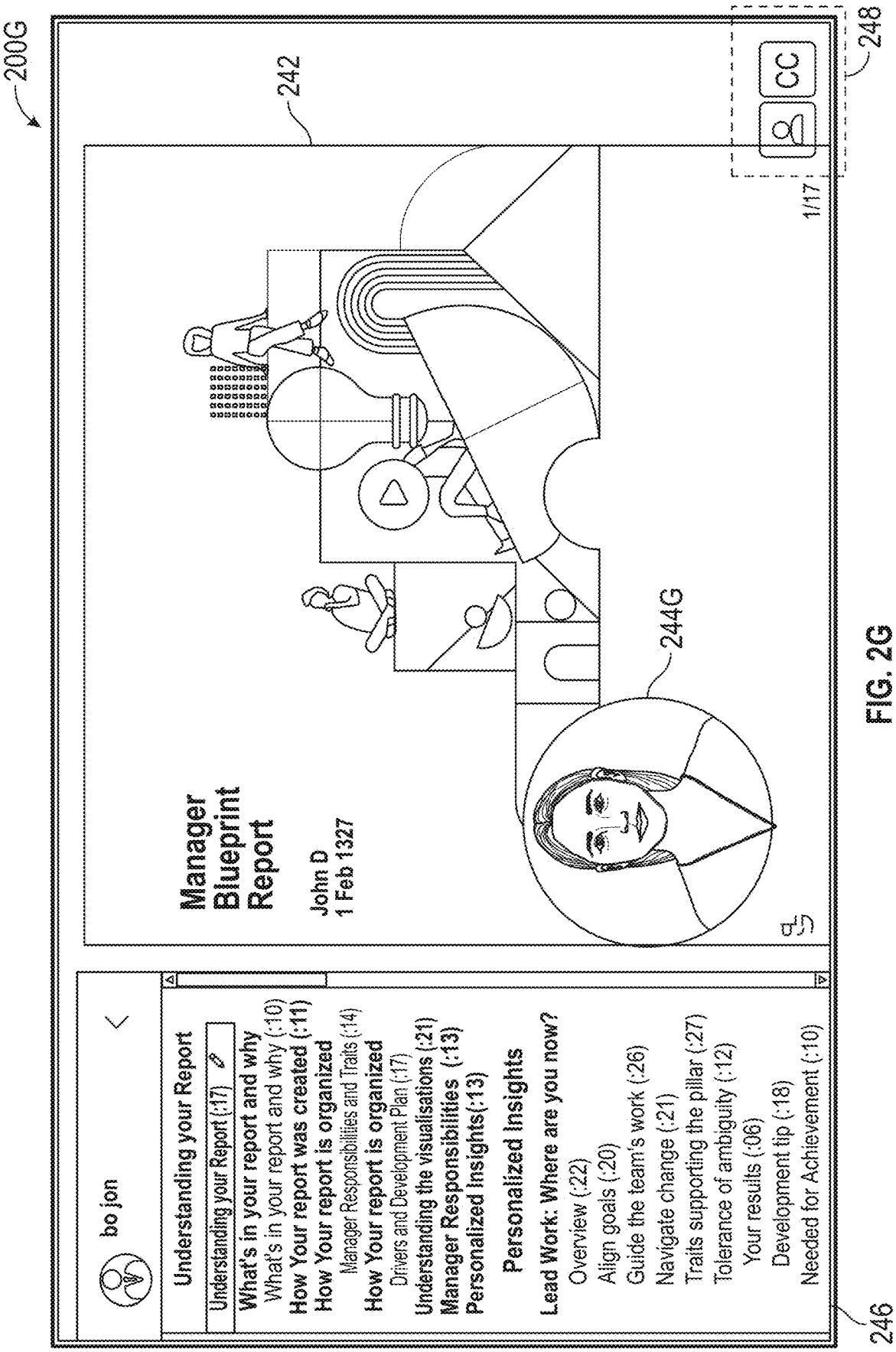

FIG. 2E to FIG. 2G illustrate that the avatar region can be positioned in a plurality of locations. In one or more examples, the location of the avatar region, e.g., 244E-244G, may be based on the location of the displayed content presented on the page of the report region 242. For example, the system may position the avatar region and determine a size of the avatar region to minimize the obstruction of displayed content on the page in the report region 242.

FIG. 3 illustrates an exemplary user interface in accordance with some embodiments of the disclosure. FIG. 3 can include a report region 342, an avatar region 344, a navigation region 346, and a plurality of user affordances. The report region 342, the navigation region 346, and a plurality of user affordances can be similar to the corresponding regions described in FIG.

FIG. 3 illustrates a user interface 300 with the avatar region turned off, e.g., removing the video of the avatar from display. For example the system can receive a user input on the avatar display user affordance 348. The system may then turn off the video portion of the video, thereby removing the avatar region from user interface 300. In one or more examples, the audio associated with the video may continue to play even though the avatar is no longer displayed on the user interface. If the system receives a user input to the avatar region display user affordance 348 while the avatar region is turned off, then the system may turn the avatar region on and display the video including the avatar.

FIG. 4 illustrates an exemplary user interface in accordance with some embodiments of the disclosure. FIG. 4 can include a report region 442, an avatar region 444, a navigation region 446, and a plurality of user affordances. The report region 442, the avatar region, the navigation region 446, and a plurality of user affordances can be similar to the corresponding regions described in FIG.

FIG. 4 illustrates a user interface 400 with the closed captioning turned on. For example, the system can receive a user input on the closed caption user affordance 448. The system may then turn on the closed captioning, thereby displaying a transcript of the speech delivered by the avatar. In one or more examples, the closed captioning may be displayed even when the avatar region may not be displayed on the user interface.

Figure 5A:
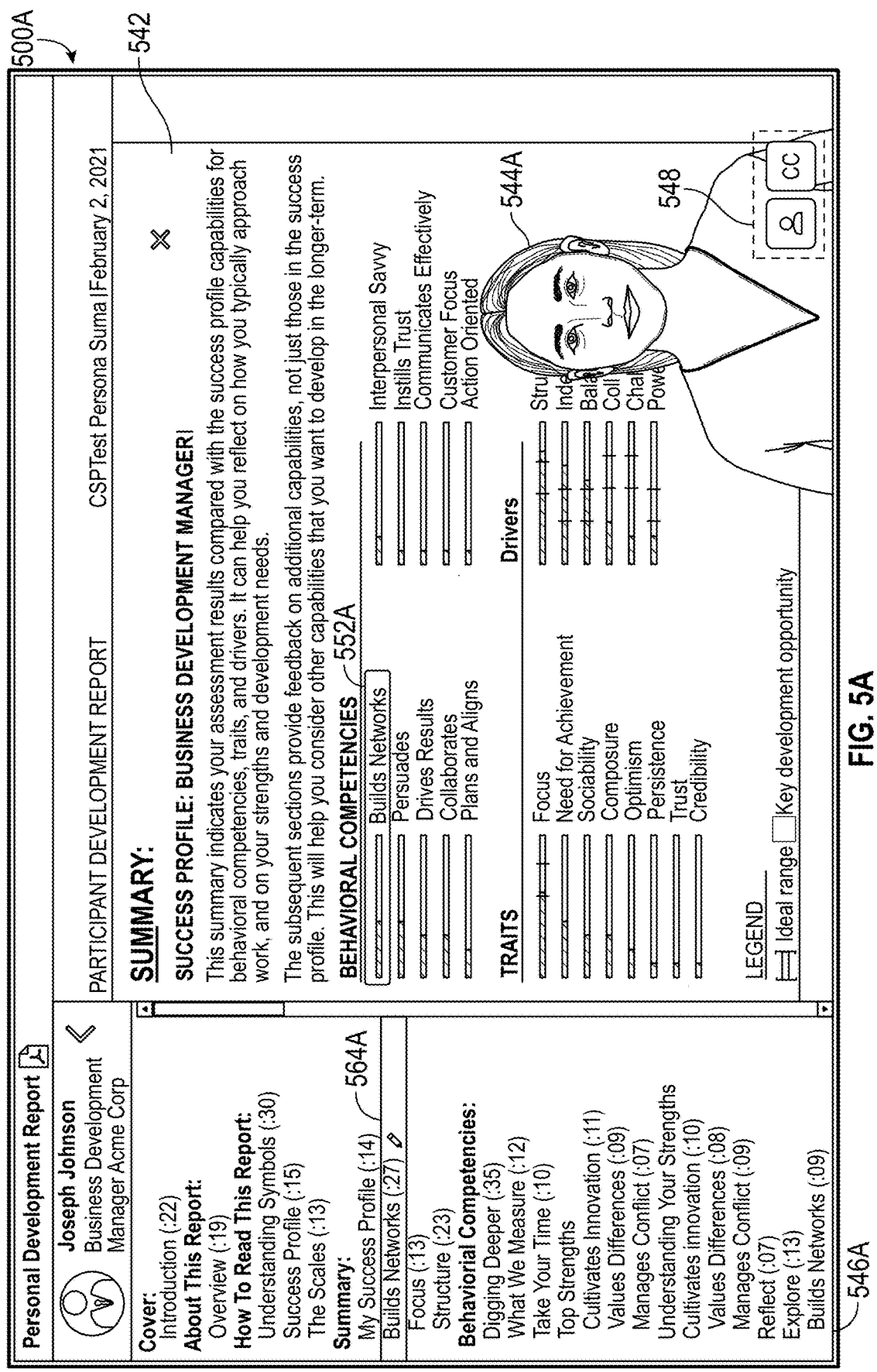
Figure 5B:
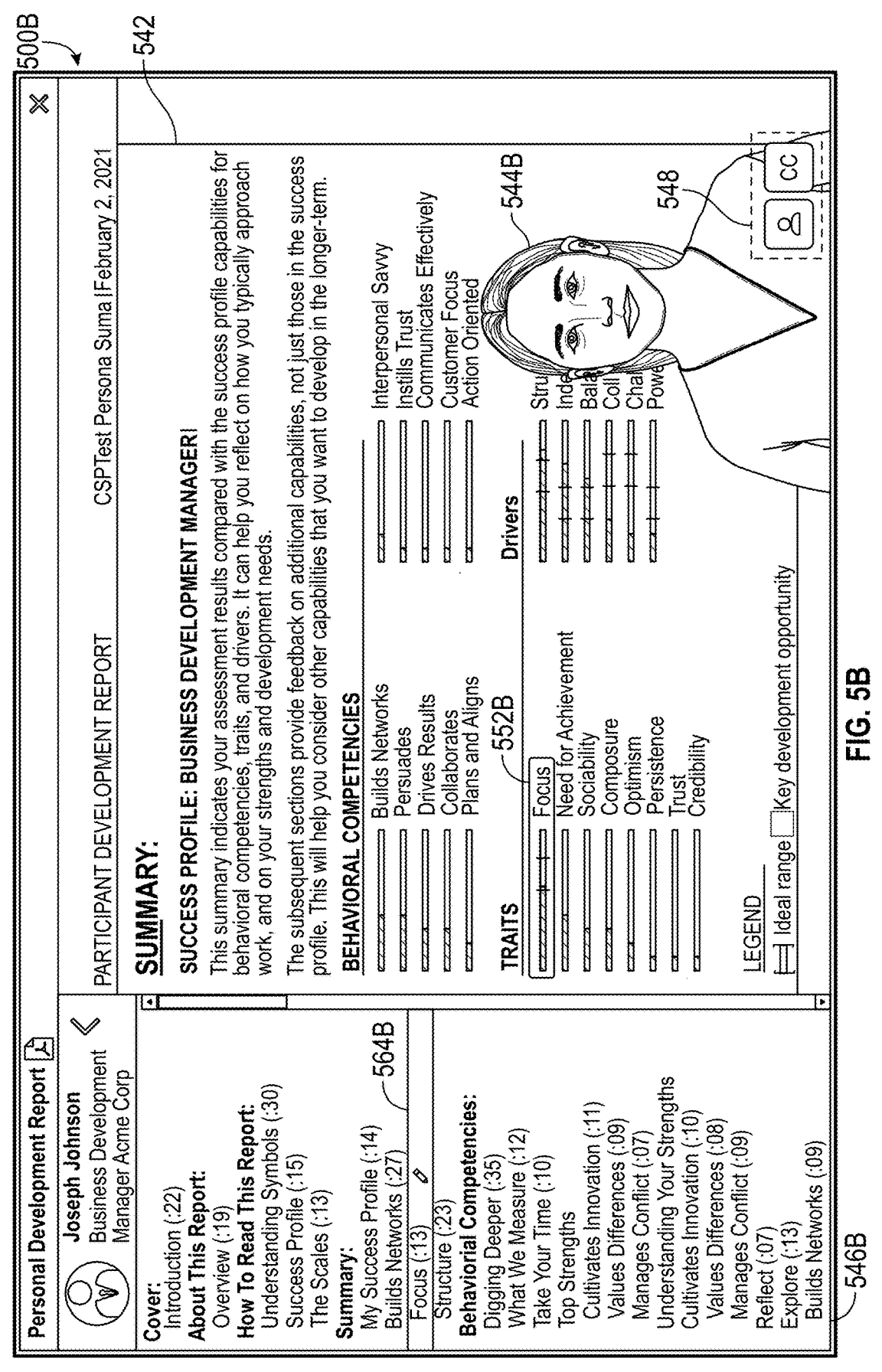
Figure 5C:
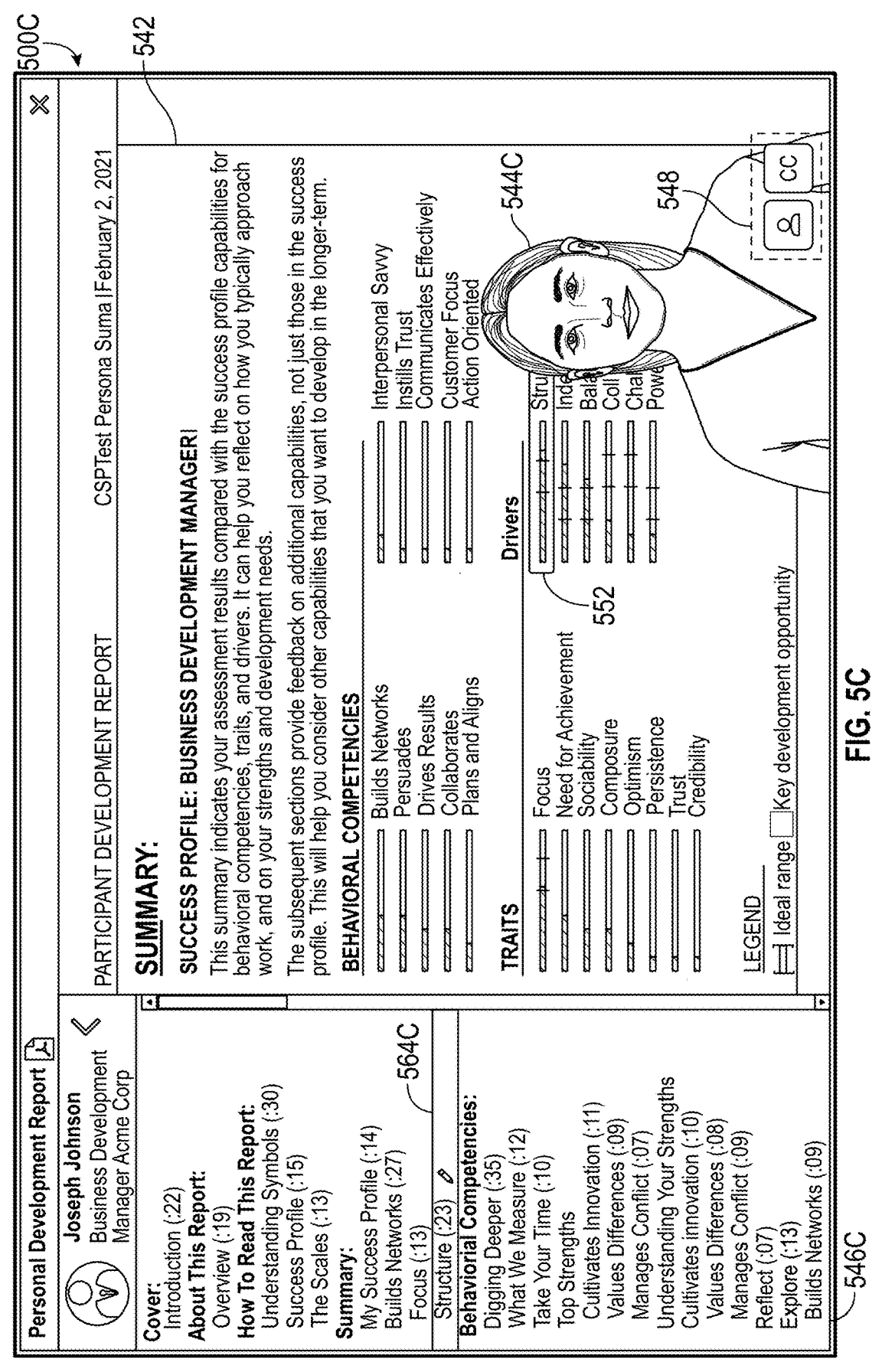

FIG. 5A to FIG. 5C illustrate exemplary user interfaces in accordance with some embodiments of the disclosure. FIG. 5A to FIG. 5C can include a report region 542, an avatar region (e.g., 544A-544C), a navigation region 546, and a plurality of user affordances 548. The report region 542, the avatar region, the navigation region 546, and a plurality of user affordances 548 may correspond to similar regions described in FIG. 1D.

In one or more examples, once playback is initiated (e.g., the system receives a user input to initiate playback) presentation of the personal assessment report can automatically progress through the table of contents displayed in the navigation pane. For example, FIGS. 5A to 5C, illustrates exemplary user interfaces 500A to 500C as the system presents the user-specific personal assessment report and sequential videos of the avatar corresponding to the successive subtopics shown in the navigation region 546.

For example, the system may display the user interface 500A, e.g., via autoplay or receiving a user selection of the Builds Networks subtopic 564A. If the user interface 500A is displayed via autoplay, once the user interface 500A is displayed, the video presented in the avatar region 544A may speak about the subtopic Builds Networks 564A highlighted in the navigation region 546A. If the user interface 500A is displayed in response to receiving a user selection, the system can play the video upon receiving a user input initiating playback.

In one or more examples, the avatar can provide a paraphrase of the page displayed in the report region. For example, the avatar can say "we can see that your top scoring behavioral competency in the success profile is Builds Networks."

After providing the paraphrase, the avatar can further provide additional or background information regarding the paraphrase. For example, the avatar can say "this is about effectively building formal and informal relationships inside and outside the organization and it seems as though this is a strong area for you. It is also in your success profile, which means that it is important to your role. Take a minute to think about this strength and review your other top strengths in the success profile." In one or more examples, the speech delivered by the avatar in the avatar region 544A may not be displayed on the page in the report region 542, e.g., the words corresponding to the speech are not explicitly displayed on the page. Rather, the avatar's speech corresponds to a paraphrase and additional or background information provided to the user to allow them to further comprehend the results of the user-specific personal assessment and engage with the report presentation.

In one or more examples, the system can highlight or emphasize a portion of the report region 542 as the video displayed in the avatar region 544 plays. For example, as discussed above, when user interface 500A is displayed, the video presented in the avatar region 544A may speak about the subtopic Builds Networks 564A highlighted in the navigation region 546A. In order to direct the user's attention to the portion of the report related to the Builds Networks subtopic, the system can highlight portion 552A of the report region 542 associated with the Builds Networks subtopic.

Once the video associated with the Builds Networks subtopic is completed, the system may automatically progress to the next subtopic in the navigation region 546A. For example, the system may display user interface 500B. User interface 500B may be associated with the Focus subtopic 564B. Accordingly, the video presented in the avatar region 544B may present the avatar speaking about the Focus subtopic 564B highlighted in the navigation region 546B. In order to direct the user's attention to the portion of the report related to the Focus subtopic, the system can highlight portion 552B of the report region associated with the Focus subtopic.

In one or more examples, the avatar can provide a paraphrase of the page displayed in the report region 542. For example, the avatar can say "now let's look at a summary of your traits and drivers results. Your top scoring trait is Focus." After providing the paraphrase, the avatar can further provide additional or background information regarding the paraphrase. For example, the avatar can say "we can see that you benefit from systems and structures in order to accurately estimate and plan." In one or more examples, the speech delivered by the avatar in the avatar region 544B may not be displayed on the page in the report region 542, e.g., the words corresponding to the speech are not explicitly displayed on the page. Rather, the avatar's speech corresponds to a paraphrase and additional or background information provided to the user to allow them to further comprehend the results of the user-specific personal assessment and engage with the report presentation.

Once the video associated with the Focus subtopic is completed, the system may automatically progress to the next subtopic in the navigation region 546B. For example, the system may display user interface 500C. User interface 500C may be associated with the Structure subtopic 564C. Accordingly, the video presented in the avatar region 544C may present the avatar speaking about the Structure subtopic 564C highlighted in the navigation region 546C. In order to direct the user's attention to the portion of the report related to the Structure subtopic, the system can highlight portion 552C of the report region associated with the Structure subtopic.

In one or more examples, the avatar can provide a paraphrase of the page displayed in the report region 542. For example, the avatar can say "Your top scoring Driver is Structure." After providing the paraphrase, the avatar can further provide additional or background information regarding the paraphrase. For example, the avatar can say "this means that in general, you have a preference for process oriented, structured, and stable work environments." In one or more examples, the speech delivered by the avatar in the avatar region 544C may not be displayed on the page in the report region 542, e.g., the words corresponding to the speech are not explicitly displayed on the page. Rather, the avatar's speech corresponds to a paraphrase and additional or background information provided to the user to allow them to further comprehend the results of the user-specific personal assessment and engage with the report presentation.

In one or more examples, the system may skip one or more subtopics displayed in the navigation region, for example, based on a user's score or preferences. For example, if a user obtained a low score for a particular personal metric, the system may not automatically present the video content associated with that personal metric. In such examples, the system may present a video in the avatar region explaining why the system will skip the subtopics, but indicate that the user may review the video content associated with those subtopics at a later time. For example, the avatar region 544A may present a video where the avatar states "in the interest of time we will not discuss the remaining behavioral competencies. However, you may return to these behavioral competencies at a later time by selecting them from the navigation region."

In one or more examples, a user may indicate that they would like to receive feedback for scores above a certain threshold, below a certain threshold, or within a particular range. For example, the user interface may present a form, survey, or the like in the report region where a user may indicate they would prefer not to receive feedback for subtopics associated with scores below a threshold (e.g., below two for a range of zero to five). In such examples, if a user received a score of one or zero for a behavioral competency (e.g., Action Oriented), the system may not present video content for the respective behavioral competency (e.g., Action Oriented). In one or more examples, personal metrics below the threshold may not be included in the navigation region (e.g., the Action Oriented behavioral competency would not be displayed in the navigation region). In one or more examples, personal metrics below the threshold may be included in the navigation region and a user may review the content by manually selecting the subtopic from the navigation region.

Figure 6A:
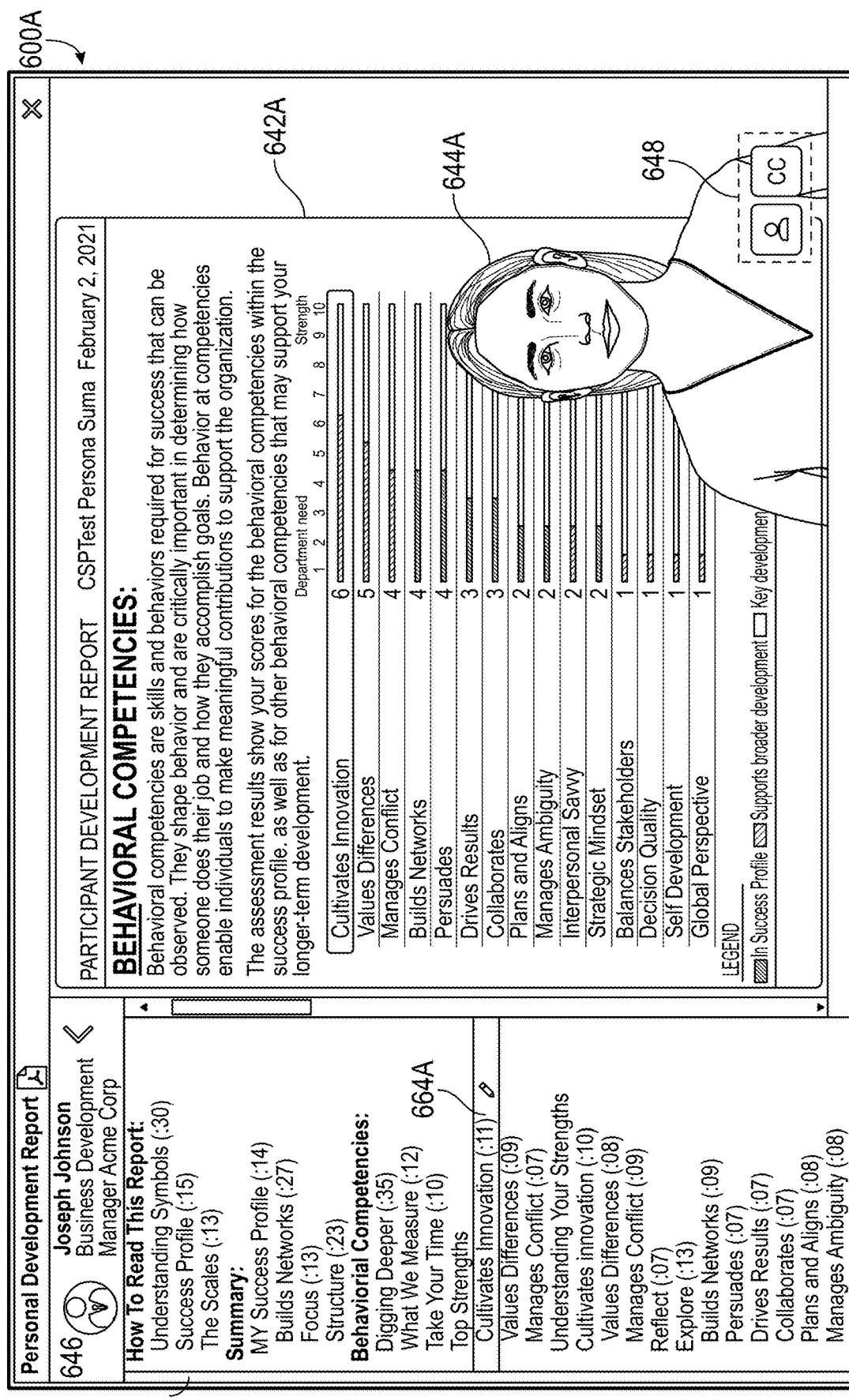
FIGS. 6A-6B illustrate exemplary user interfaces for presenting a user-specific personal assessment report in accordance with some embodiments of this disclosure.
Figure 6B:
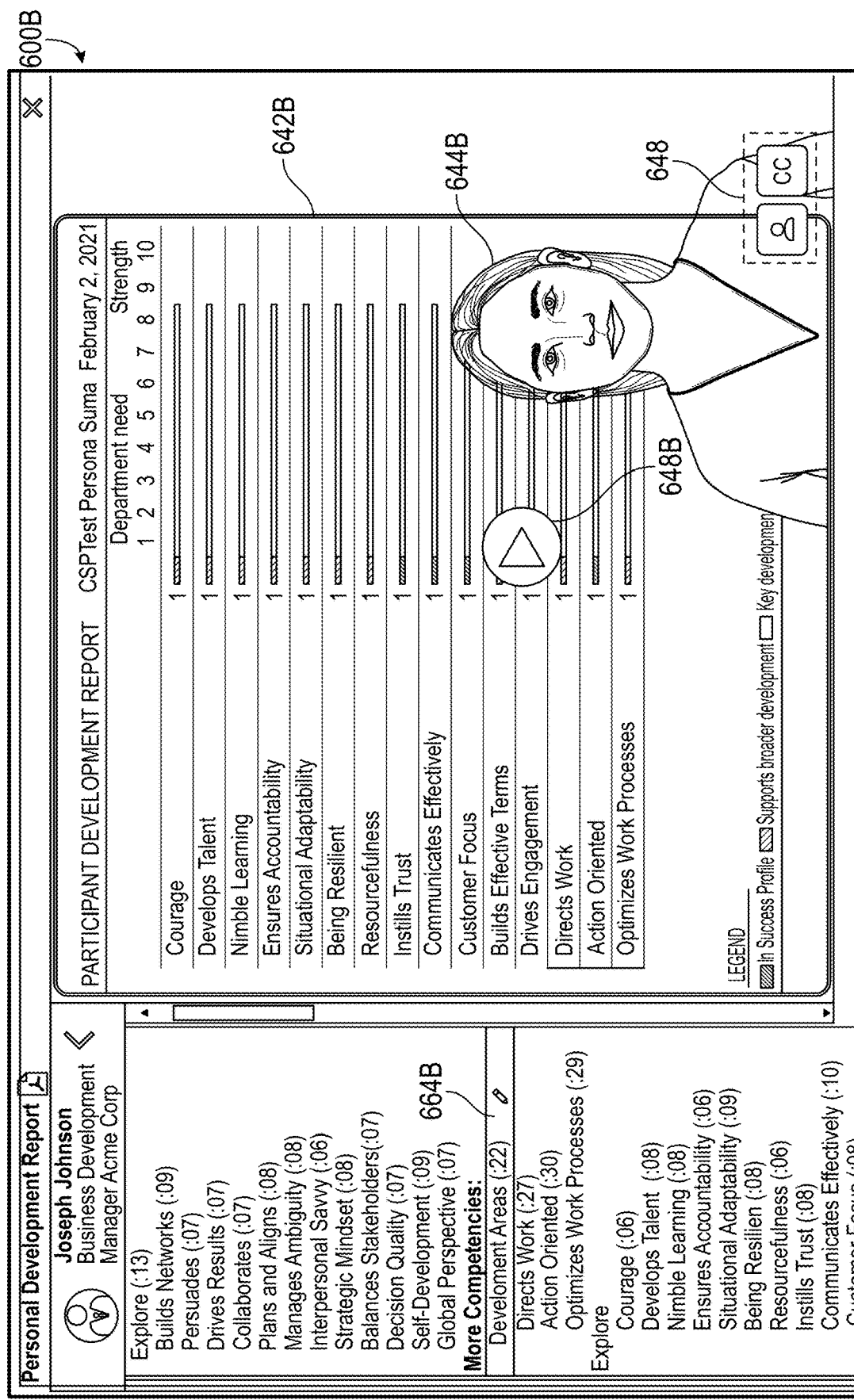

FIGS. 6A and 6B illustrate exemplary user interfaces in accordance with some embodiments of the disclosure. FIGS. 6A and 6B can include a report region (e.g., 642A and 642B), an avatar region (e.g., 644A and 644B), a navigation region (e.g., 646A and 646B), and a plurality of user affordances 648. The report region 642A and 642B, the navigation region 646A and 646B, and the plurality of user affordances 648 may correspond to similar regions described in FIG. 1D.

In one or more examples, the system can navigate between the topics and subtopics listed in the navigation region based on a user input. FIGS. 6A to 6B, illustrate exemplary user interfaces 600A and 600B as the system navigates between subtopics based on user input.

For example, user interface 600A in FIG. 6A may be associated with the Cultivates Innovation subtopic 664B. For example, as shown in the figure the Cultivates Innovation subtopic 664A is highlighted in the navigation region 646A. Accordingly, the video presented in the avatar region 644A may present the avatar speaking about the Cultivates Innovation subtopic.

For example, the avatar can provide a paraphrase of the page displayed in the report region 6. For example, the avatar can say "let's take a closer look at your strengths. Your top strength, is Cultivates Innovation." After providing the paraphrase, the avatar can further provide additional or background information regarding the paraphrase. For example, the avatar can say "Cultivates Innovation is about creating new and better ways for the organization to be successful." In one or more examples, the speech delivered by the avatar in the avatar region 644A may not be displayed on the page in the report region 642A, e.g., the words corresponding to the speech are not explicitly displayed on the page.

In one or more examples, the navigation region can be used to select and playback a new subtopic (e.g., a subtopic not currently being presented). If a user desires to navigate to a different subtopic during playback of the video presented in the avatar region 644A or while playback is paused, the user may select a desired subtopic from the navigation region. For example, the system can receive an indication from a user input device that the user has selected the Development Areas subtopic 664B (in FIG. 6B). The system can then stop playback of the video associated with the current user interface 600A and display the user interface associated with the selected subtopic, e.g., user interface 600B. The new subtopic may be associated with the same topic as the current subtopic or a different topic.

As shown in FIG. 6B, the Development Areas subtopic 664B is associated with the More Competencies topic, which is a different topic than the Behavioral Competencies topic associated with the Cultivates Innovation subtopic 664A. In such examples, where the new subtopic is associated with a different topic, the user interface 600B may present a page associated with the new, different topic in the report region and the video presented in the avatar region can correspond to the selected subtopic. For example, as shown in user interface 600B, the page presented in the report region 642B is associated with the More Competencies topic 662B. The video displayed in the avatar region 644B may correspond to the selected Development Areas subtopic 664B.

For example, the avatar can provide a paraphrase of the page displayed in the report region. For example, the avatar can say "Next we are going to look at your development areas. You may have noticed that the bottom three scales have been shaded differently, and looking at the legend we can see that these scales represent key development opportunities. As these are your lowest scoring scales, they may represent useful areas to focus on, especially if any or all of them are also in your Success Profile." In one or more examples, the speech delivered by the avatar in the avatar region 644A may not be displayed on the page in the report region 642A, e.g., the words corresponding to the speech are not explicitly displayed on the page.

In one or more examples, if a user navigates to a different subtopic associated with the same topic, the page displayed in the report region may remain the same, while the video displayed in the avatar region can change. For example, if the user interface 600B is presented to a user and the system receives a selection of a new subtopic, e.g., Action Oriented, then the system may present a new user interface that includes the same page (e.g., associated with the More Competencies topic), but a new video (e.g., associated with the Action Oriented subtopic).

In one or more examples, when a user navigates to a new topic or subtopic, the system may present a user affordance for initiating playback once the user interface associated with the selected subtopic is displayed. For example user interface 600B illustrates user affordance 648B for initiating playback. In one or more examples, the system may automatically initiate playback of subsequent subtopics once the user interface associated with the selected subtopic is displayed.

Figure 7A:
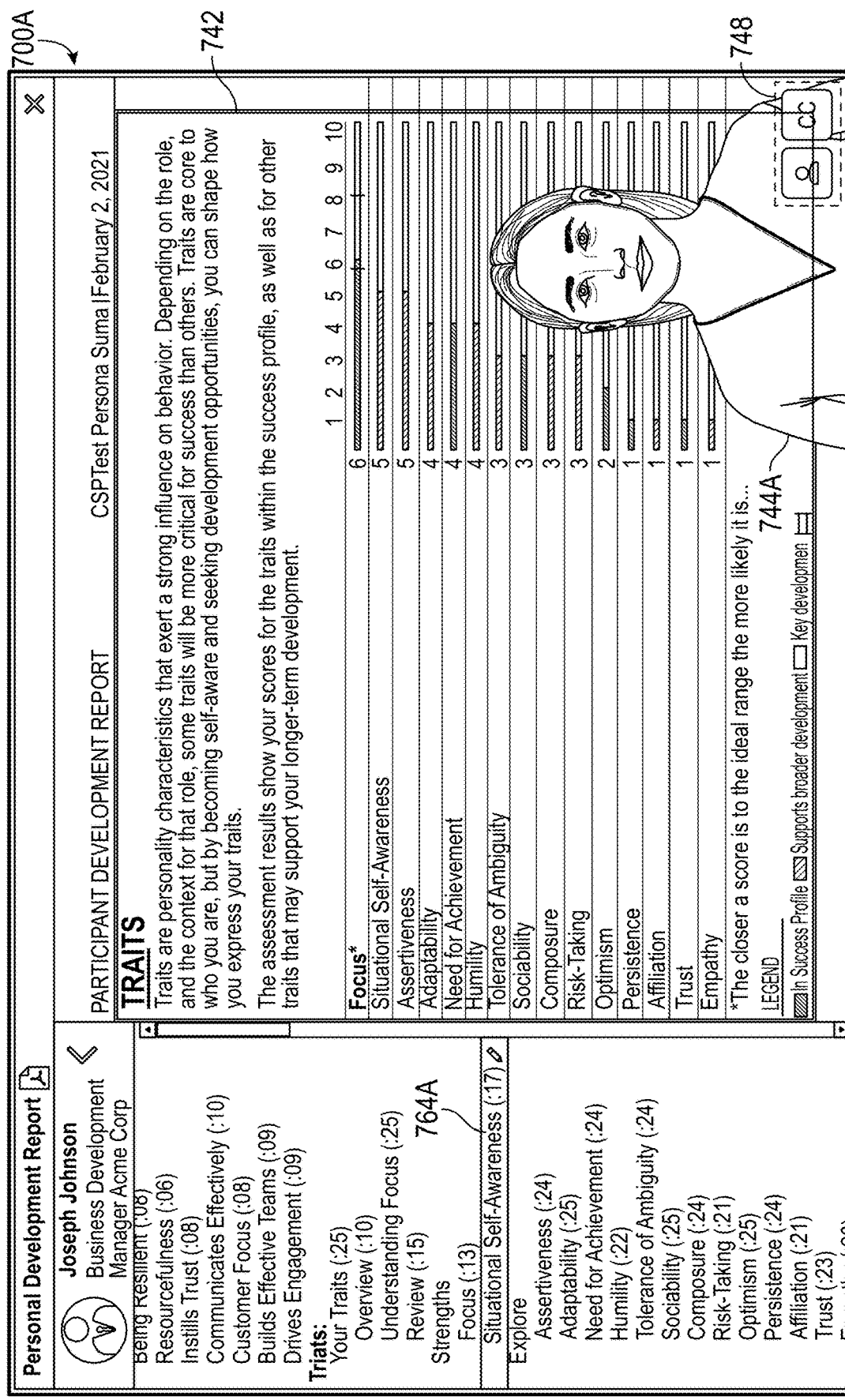
FIGS. 7A-7B illustrate exemplary user interfaces for presenting a user-specific personal assessment report in accordance with some embodiments of this disclosure.
Figure 7B:
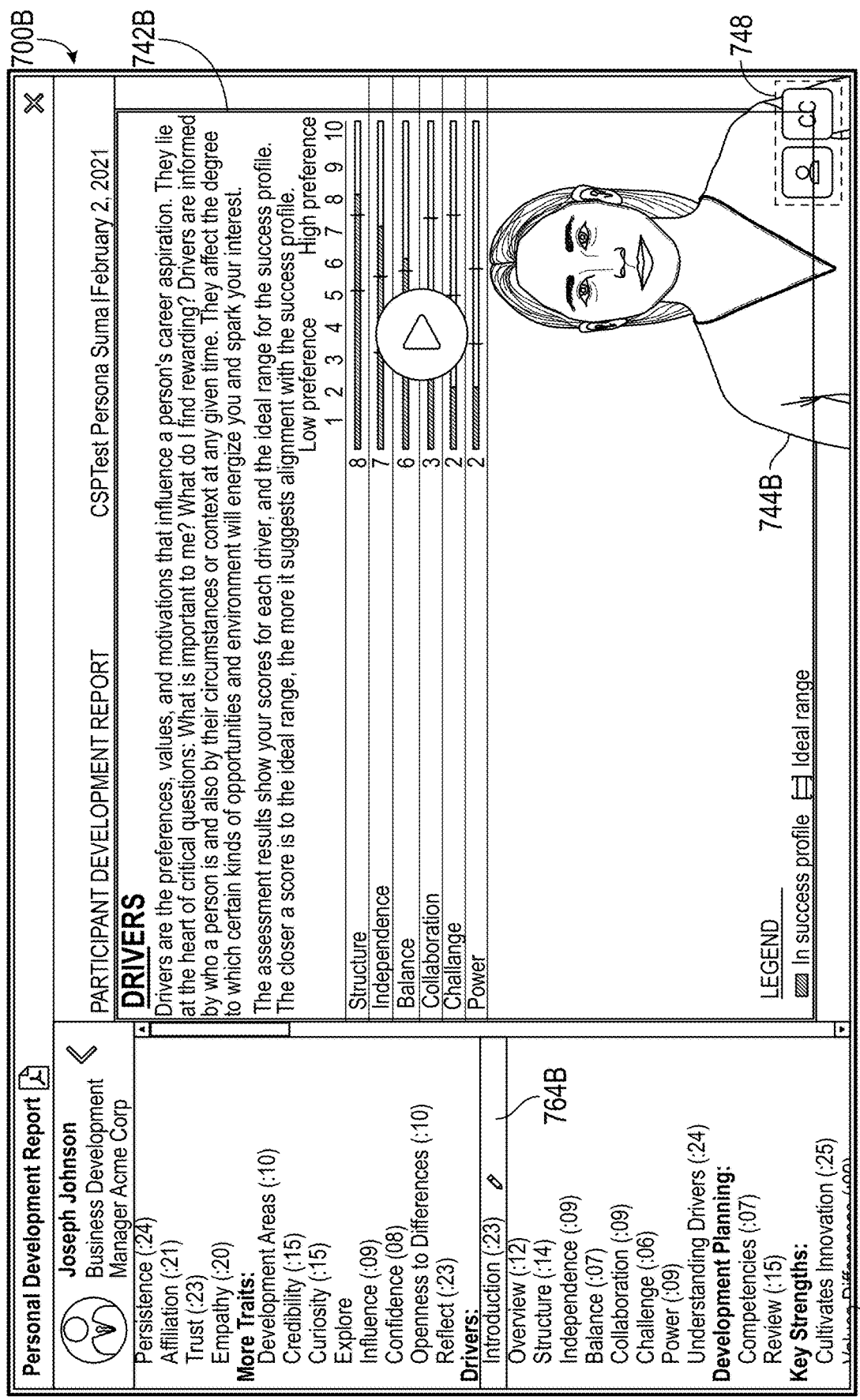

FIGS. 7A and 7B illustrate exemplary user interfaces 700A and 700B in accordance with some embodiments of the disclosure. User interfaces 700A and 700B can include a report region 742A and 742B, an avatar region 744A and 744B, a navigation region 746A and 746B, and a plurality of user affordances 748. The report region 742A and 742B, the avatar region 744A and 744B, the navigation region 746A and 746B, and the plurality of user affordances 748 may correspond to similar regions described in FIG. 1D.

Exemplary user interface 700A can be associated with the Traits topic of the user-specific personal assessment report. The page displayed in the report region 742A can correspond to an exemplary Traits page associated with the user-specific personal assessment report associated with the Traits topic. The video presented in the avatar region 744A can include content related to the Traits topic and the Situational Awareness Subtopic 764A.

Exemplary user interface 700B can be associated with the Drivers topic of the user-specific personal assessment report. The page displayed in the report region 742B can correspond to an exemplary Drivers page associated with the user-specific personal assessment report associated with the Drivers topic. The video presented in the avatar region 744B can include content related to the Drivers topic and the Introduction subtopic 764B.

In one or more examples, the user-specific personal assessment report can be tailored for a particular group, association, or company. For example, in some embodiments, the user-specific personal assessment report can be designed to seamlessly integrate with a company's brand by, for example, but limited to, adopting the fonts, colors, graphics, and graphical designs associated with a particular group, association, or company. In this manner, users associated with the company may interact with a familiar report region for the user-specific personal assessment report.

Figure 8A:
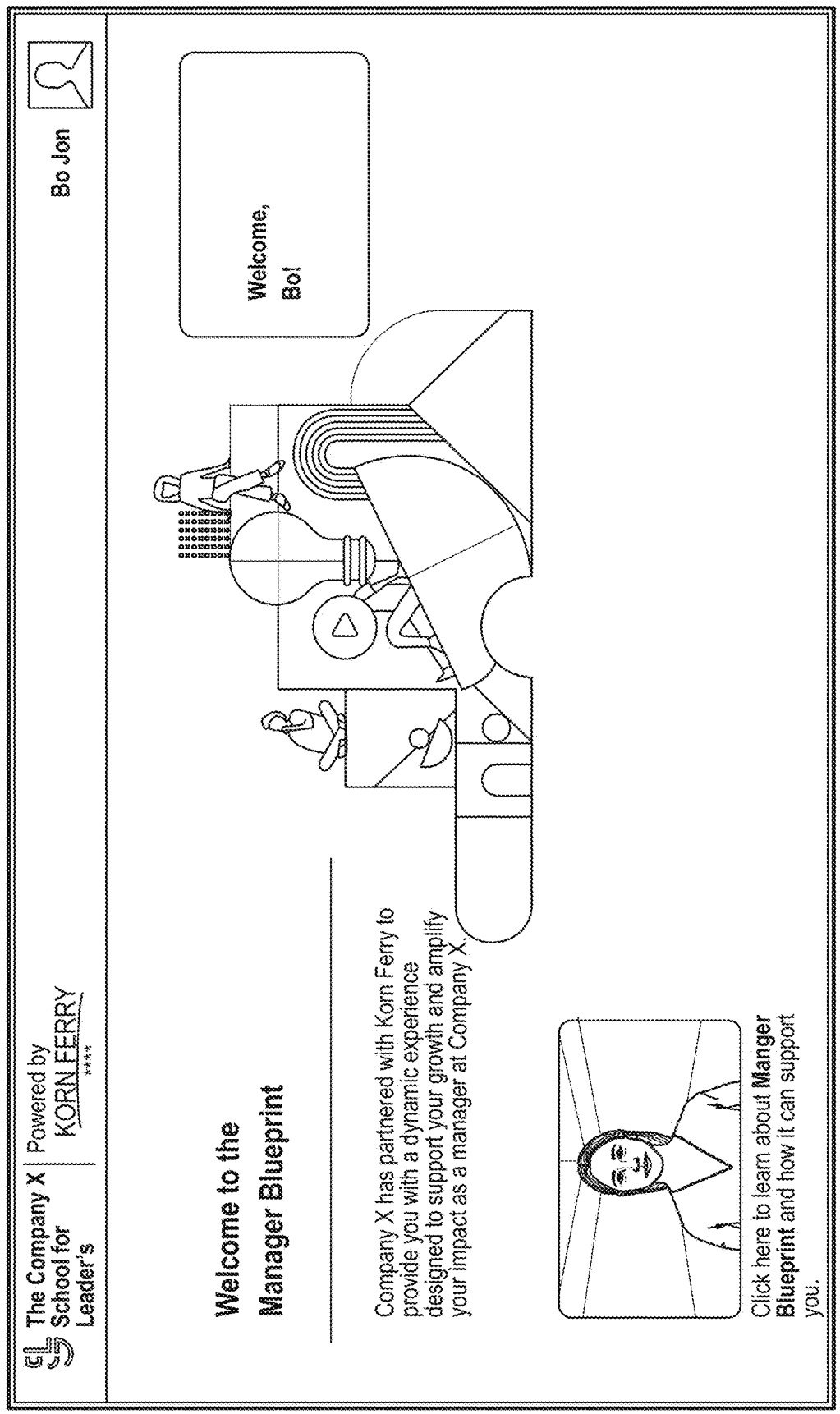
FIGS. 8A-8C illustrate exemplary user interfaces for presenting a user-specific personal assessment report in accordance with some embodiments of this disclosure.

FIG. 8A illustrates an exemplary user interface 800A in accordance with embodiments of the present disclosure. In one or more examples the user interface 800A can correspond to a home page that allows a user to take a personal assessment questionnaire and receive the results of a personal assessment questionnaire, e.g., receive a presentation of the user-specific personal assessment report.

Figure 8B:
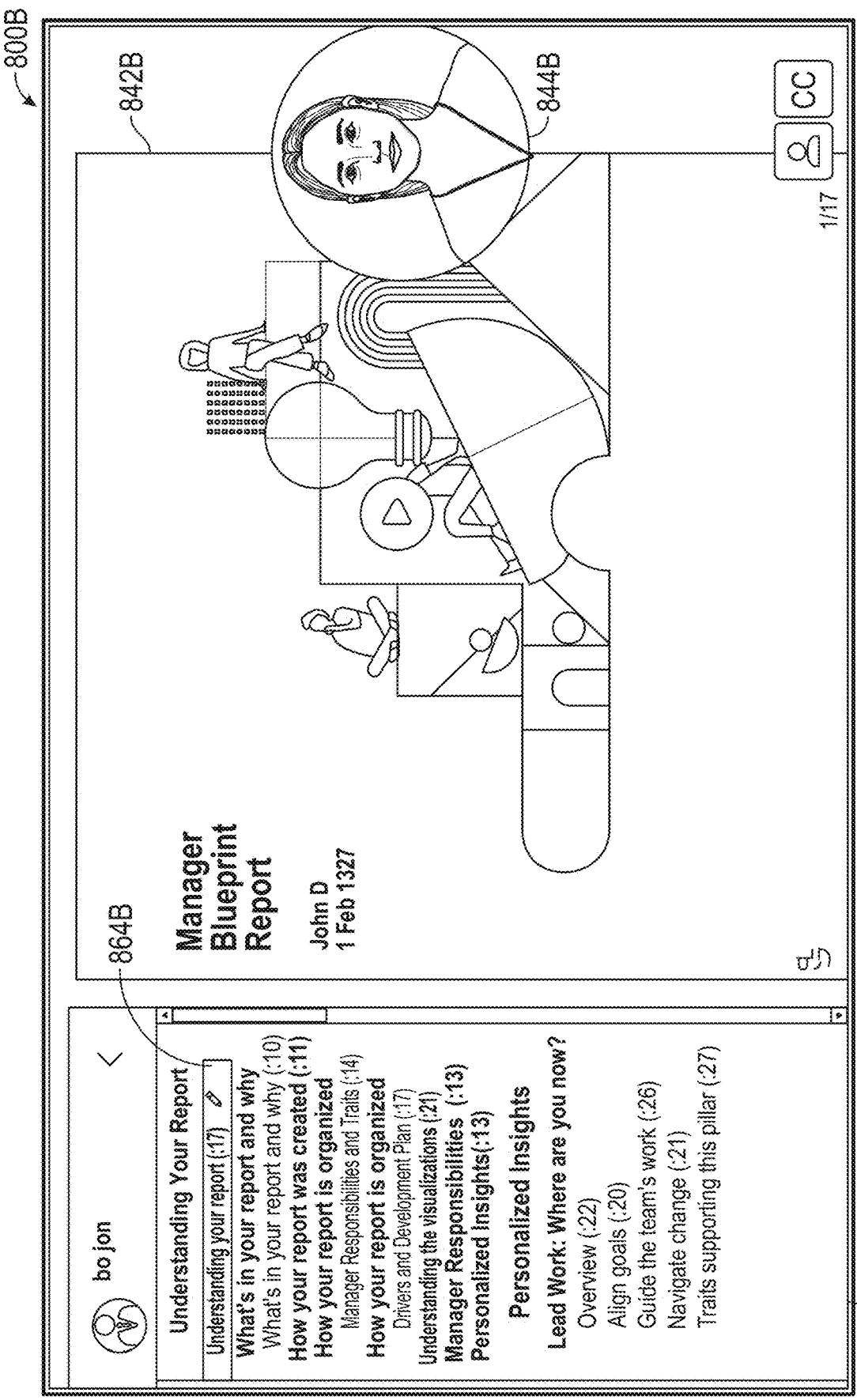

FIG. 8B illustrates an exemplary user interface 800B in accordance with embodiments of the present disclosure. User interface 800B can be associated with a presentation of the user-specific personal assessment report. As shown in the figure, user interface 800B can include a navigation region 846B, a report region 842B, an avatar region 844B, and one or more user affordances 848. The navigation region 846B, the report region 842B, the avatar region 844B, and the one or more user affordances 848 may correspond to similar regions described in FIG. 1D.

Figure 8C:
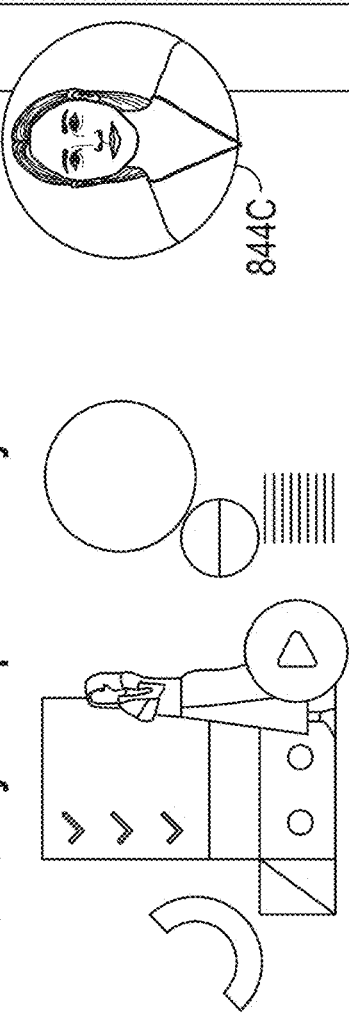

FIG. 8C illustrates an exemplary user interface 800C in accordance with embodiments of the present disclosure. User interface 800C can be associated with a presentation of the personal assessment report. For example, user interface 800C may be automatically presented to a user after user interface 800B, e.g., after the video presented in the avatar region 844B is complete. As shown in the figure, user interface 800C can include a navigation region 846C, a report region 842C, an avatar region 844C, and one or more user affordances 848. The navigation region 846C, the report region 842C, the avatar region 844C, and the one or more user affordances 848 may correspond to similar regions described in FIG. 1D.

As shown in FIGS. 8B and 8C, in one or more examples, as the presentation of the user-specific personal report progresses, the location and/or size of the avatar region may automatically be adjusted based on the layout and the content included on the page of the user-specific personal assessment report presented in the report region. For example, as shown in user interface 800B, the avatar region 844B is a first size and overlaps with the middle right side of the report region 842B. As shown in user interface 800C, the avatar region 844C is a second size and overlaps with the upper right corner of the report region 842C.

Figure 9A:
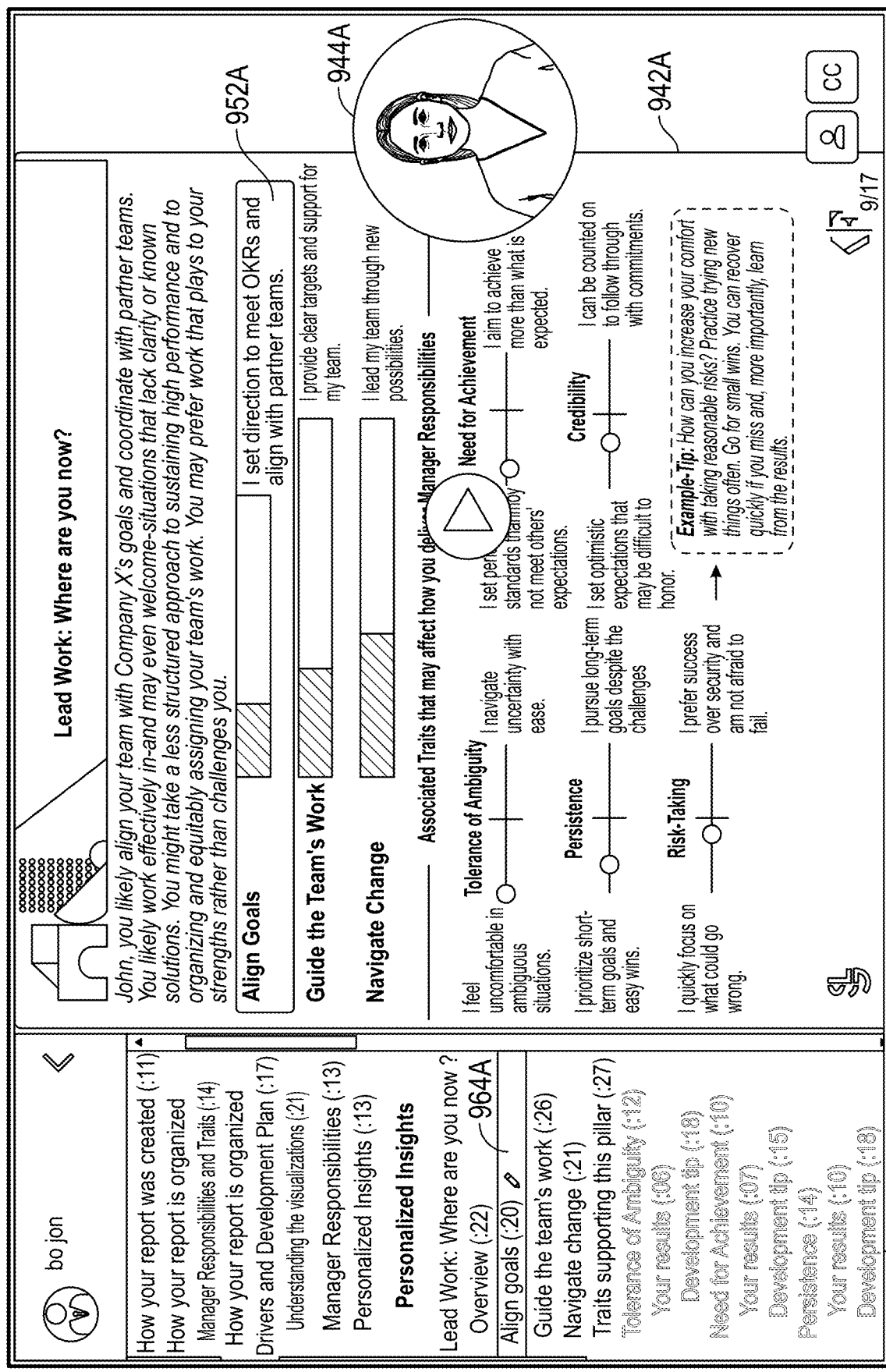
FIGS. 9A-9B illustrate exemplary user interfaces for presenting a user-specific personal assessment report in accordance with some embodiments of this disclosure.
Figure 9B:
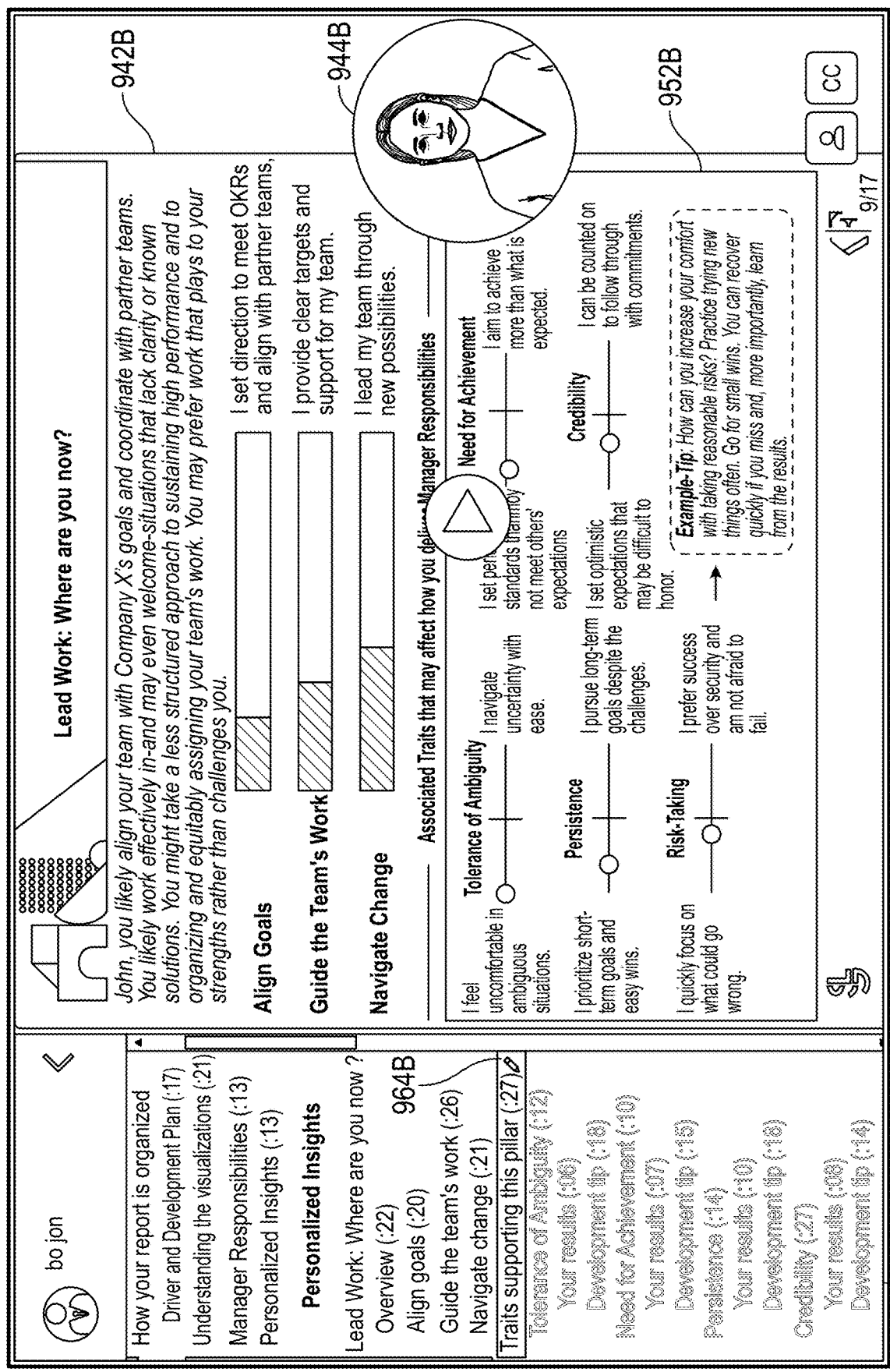

FIGS. 9A and 9B illustrate exemplary user interfaces 900A and 900B in accordance with some embodiments of the disclosure. FIGS. 9A and 9B, illustrate exemplary user interfaces 900A and 900B as the system presents a videos of the avatar in the avatar region. FIGS. 9A and 9B can include a report region 942A and 942B, a navigation region 946A and 946B, an avatar region 944A and 944B, and a plurality of user affordances 548. The report region 942A and 942B, the navigation region 946A and 946B, the avatar region 944A and 944B, and the plurality of user affordances 548 may correspond to similar regions described in FIG. 1D.

In one or more examples, the system can highlight or emphasize a portion of the report region while presenting the video displayed in the avatar region. For example, in user interface 900A, the video presented in the avatar region 944A may speak about the Align Goals subtopic 964A highlighted in the navigation region 946A. In order to direct the user's attention to the portion of the report related to the Builds Networks subtopic, the system can highlight portion 952A of the page displayed in the report region 942A associated with the Align Goals subtopic.

Once the video associated with the Align Goals subtopic is completed, the system may automatically progress to the subsequent subtopics in the navigation region 946A. FIG. 9B illustrates an exemplary subsequent user interface 900B that may be displayed after 900A. User interface 900B may be associated with the Traits Supporting This Pillar subtopic 964B. Accordingly, the video presented in the avatar region 944B may include content of the avatar speaking about the Traits Supporting This Pillar subtopic 964B highlighted in the navigation region 946B. In order to direct the user's attention to the portion of the report related to the Traits Supporting This Pillar subtopic 964B, the system can highlight portion 952B of the report region associated with the Traits Supporting This Pillar subtopic 964B.

Figure 10A:
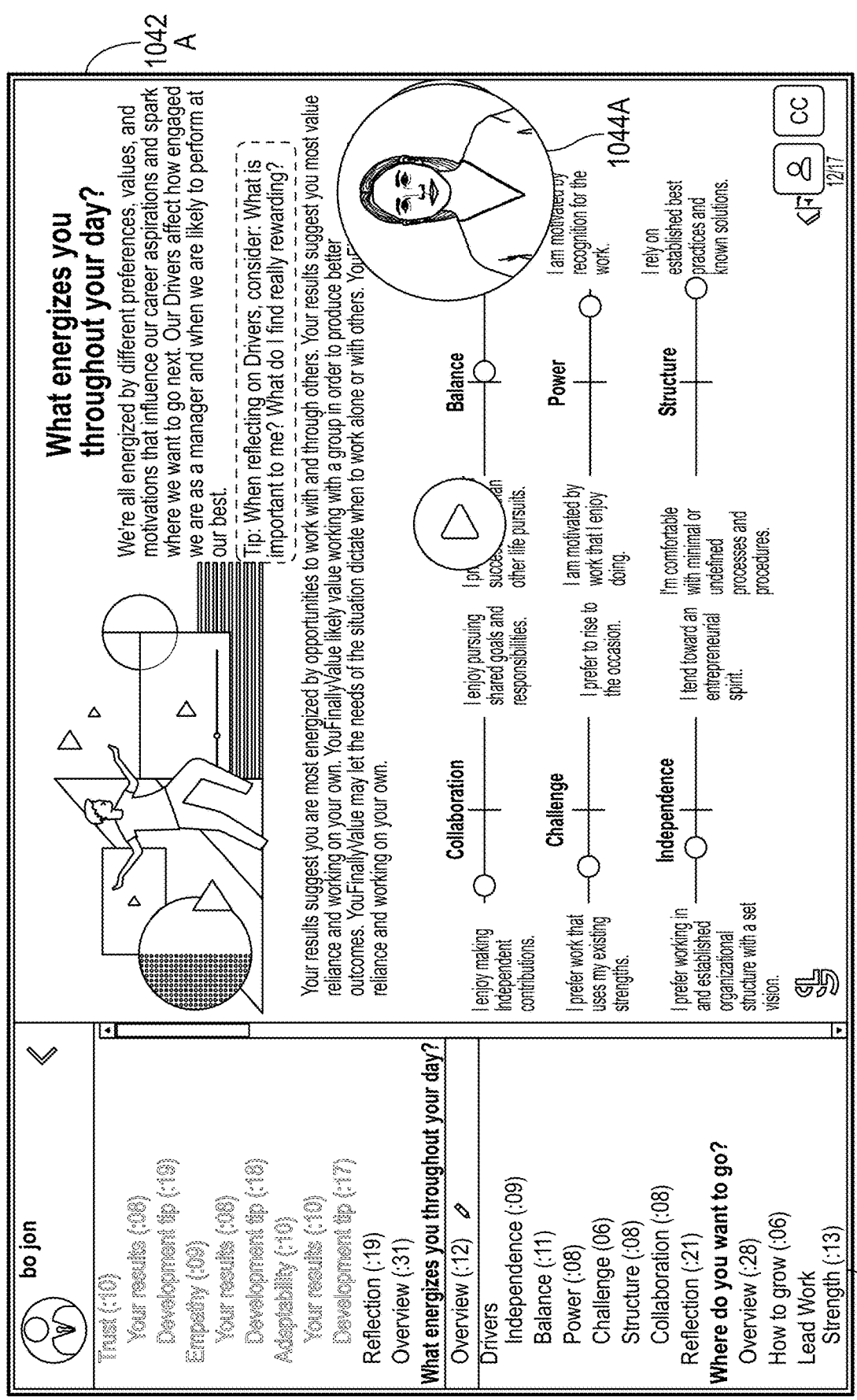

FIG. 10A illustrates an exemplary user interface 1000A in accordance with embodiments of the present disclosure. In one or more examples, presentation of the personal assessment report can be tailored to a particular group, association, or company. As shown in the figure, user interface 1000A can include a navigation region 1046A, a report region 1042A, an avatar region 1044A, and one or more user affordances 1048. In one or more examples, user interface 1000A can be similar to the user interfaces described above.

User interface 1000A can be associated with the What energizes you throughout your day topic, shown in the navigation region 1046A. As shown in the figure, this topic is associated with the drivers personal metrics categories. For example, the content on the page presented in the report region 1042A includes scores for the collaboration, challenge, independence, balance, power, and structure personal metrics. Accordingly, user interface 1000A provides an example of how the user-specific personal report and the presentation of the user-specific personal report can be customizable and tailored to a particular brand. For example, a comparison of user interface 1000A and 700B, illustrate differences in the layout and graphics of the page of the user-specific report. Tailoring the content to a particular brand may help the information regarding the takeaways from the user-specific personal assessment report resonate with the users. Further, a comparison of the user interface 1000A and 700B further exemplify differences in the framing of the delivery of the content of the user-specific personal assessment report. For example, while user interface 700B, frames the drivers personal metric category as indicative of personal metrics that provide motivation to an individual, user interface 1000A frames the drivers personal metric category as indicative of personal metrics that can energize an individual. In this manner, the presentation of the user-specific personal assessment report can maintain the values and framing of a brand associated with a particular group, association, or company.

Figure 10B:
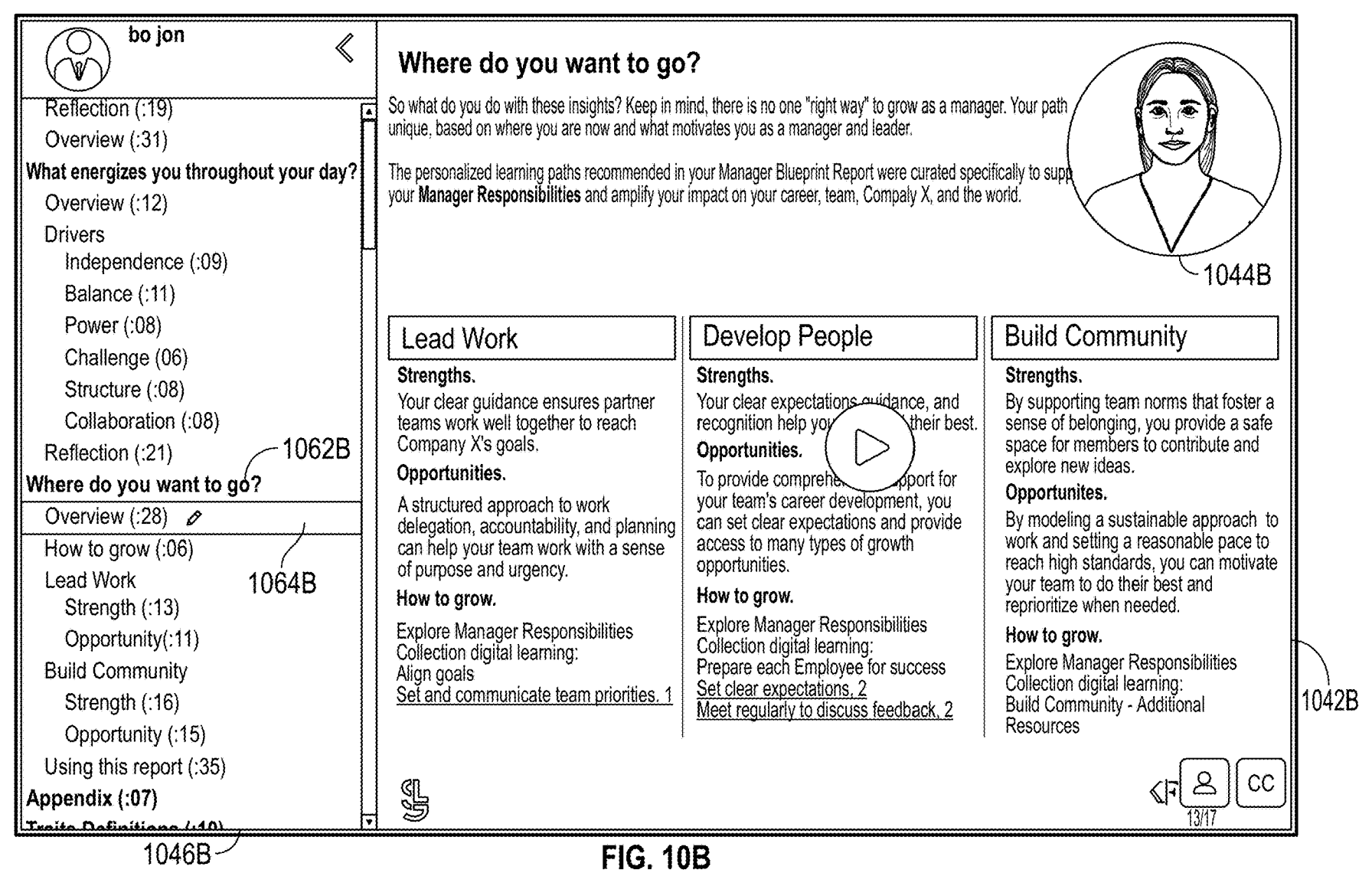

FIG. 10B illustrates an exemplary user interface 1000B in accordance with embodiments of the present disclosure. As shown in the figure, user interface 1000B can include a navigation region 1046B, a report region 1042B, an avatar region 1044B, and one or more user affordances 1048. In one or more examples, user interface 1000B can be similar to the user interfaces described above.

In one or more examples, as the videos in the Where do you want to go topic 1062B are presented via the avatar region 1044B, may paraphrase the content included on the page. For example, in the overview subtopic 1064B, the speech presented by the avatar may not be a verbatim recitation of the text on the page. In one or more examples, the avatar may provide further information, e.g., background information and/or information that anticipates commonly asked questions, to supplement the text shown on the page presented in the report region 1042B.

Figure 11:
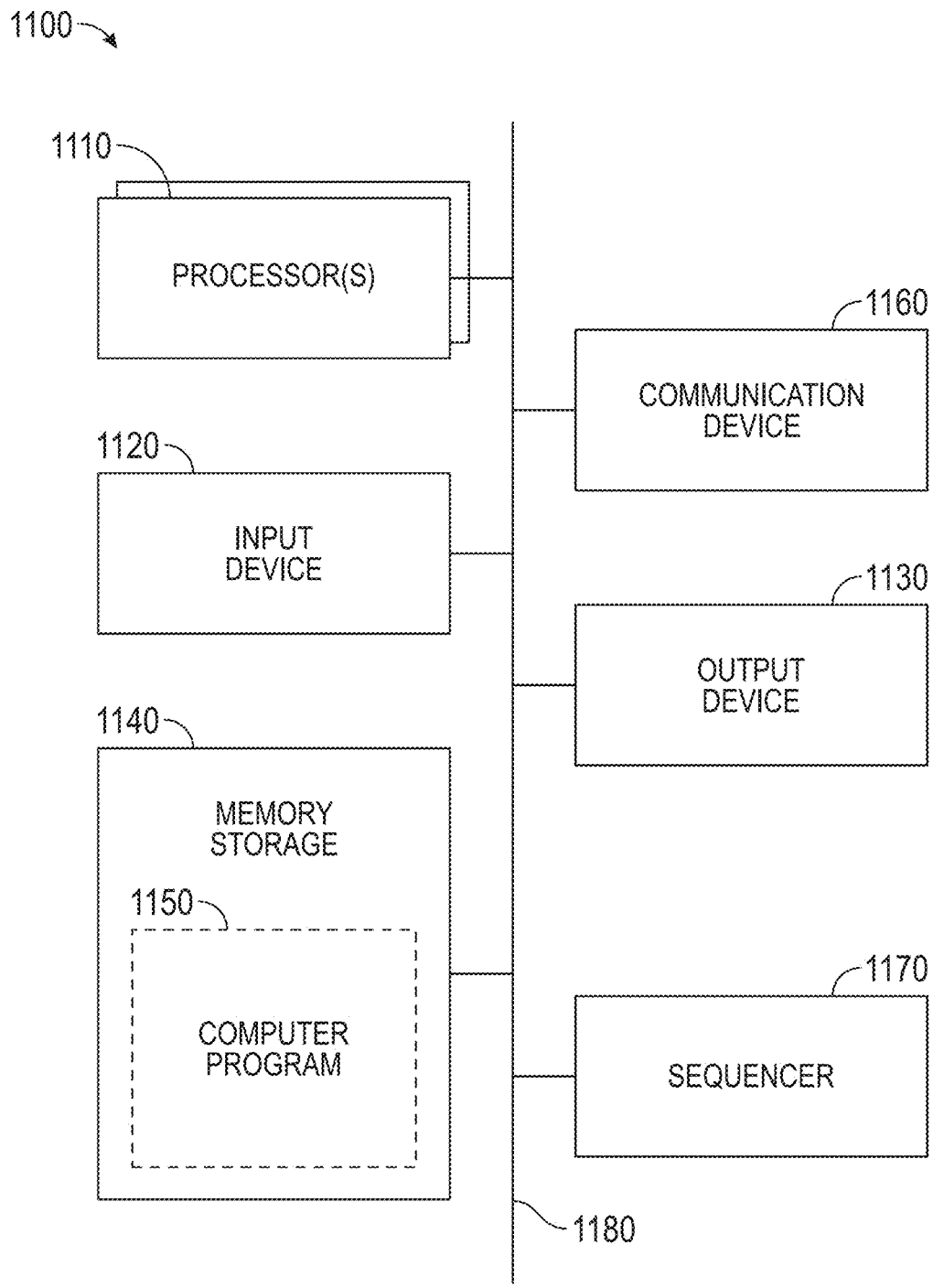
FIG. 11 illustrates an exemplary system for presenting a user-specific personal assessment report in accordance with some embodiments of this disclosure.

FIG. 11 illustrates an example of a computing device in accordance with one embodiment. For example, the device 1100 can be used to perform process 100A, described above. Device 1100 can be a host computer connected to a network. Device 1100 can be a client computer or a server. As shown in FIG. 11, device 1100 can be any suitable type of microprocessor-based device, such as a personal computer, workstation, server or handheld computing device (portable electronic device) such as a phone or tablet. The device can include, for example, one or more of processor 1110, input device 1120, output device 1130, storage 1140, and communication device 1160. Input device 1120 and output device 1130 can generally correspond to those described above, and can either be connectable or integrated with the computer.

Input device 1120 can be any suitable device that provides input, such as a touch screen, keyboard or keypad, mouse, or voice-recognition device. Output device 1130 can be any suitable device that provides output, such as a touch screen, haptics device, or speaker.

Storage 1140 can be any suitable device that provides storage, such as an electrical, magnetic or optical memory including a RAM, cache, hard drive, or removable storage disk. Communication device 1160 can include any suitable device capable of transmitting and receiving signals over a network, such as a network interface chip or device. The components of the computer can be connected in any suitable manner, such as via a physical bus or wirelessly.

Software 1150, which can be stored in storage 1140 and executed by processor 1110, can include, for example, the programming that embodies the functionality of the present disclosure (e.g., as embodied in the devices as described above).

Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1150 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

We claim:

1. A computer-implemented method for generating and presenting a user-specific personal assessment report, comprising:
   receiving, from a user, a plurality of answers corresponding to a plurality of predetermined questions in a personal assessment questionnaire;
   generating, based on the plurality of answers, the user-specific personal assessment report comprising a plurality of static pages;
   displaying a user interface for presenting the user-specific personal assessment report, the user interface comprising:
      a report region for displaying a page of the plurality of static pages;
      an avatar region for presenting a video of an avatar, wherein:
         one or more images of the video of the avatar are generated according to a first output from a first machine-learning model,
         the first machine-learning model is trained, using a plurality of images corresponding to an appearance of the avatar, to provide the first output,
         the avatar is configured to be partially overlaid on the report region, and
         a first location and a first size of the avatar are determined based on content displayed on the page;
   receiving the user input initiating playback of the user interface;
   in response to receiving the user input, initiating playback of the video of the avatar providing speech in the avatar region, wherein the speech of the avatar comprises an audio paraphrase of the page, wherein:
      the audio of the paraphrase is generated according to a second output from a second machine-learning model, and
      the second machine-learning model receives the plurality of answers and provides the second output according to the received plurality of answers;
   receiving a user input indicative of resizing a window of the user interface from a first size to a second size; and
   determining a second location and a second size of the avatar based on the second size of the user interface and a reduction of an overlap between the avatar and the content displayed on the user interface at the second size.

2. The method of claim 1, further comprising:
   obtaining a plurality of scores based on the plurality of answers;
   selecting one or more speech segments according to the plurality of scores;
   generating a script based on the selected one or more speech segments; and
   selecting one or more of video segments of the avatar from a video repository according to the plurality of scores, wherein the video of the avatar is generated further based on the selected one or more video segments.

3. The method of claim 2, wherein the video repository comprises a plurality of pre-generated videos of the avatar.

4. The method of claim 3, further comprising obtaining the plurality of pre-generated videos of the avatar, wherein the plurality of pre-generated videos of the avatar are obtained using the first machine-learning model.

5. The method of claim 1, wherein the user interface further comprises a navigation region comprising a plurality of topics for navigating to the plurality of static pages.

6. The method of claim 5, wherein the page of the static pages is associated with a topic of the plurality of topics.

7. The method of claim 5, further comprising:
receiving a second user input indicative of a selection of a topic of the plurality of topics;
in response to receiving the second user input, displaying a second page of the static pages; and
initiating playback of a second video of the avatar in the avatar region, wherein the second video comprises an audio paraphrase of the second page.

8. The method of claim 7, further comprising receiving a third user input for initiating playback of the second video.

9. The method of claim 1, wherein the speech of the avatar comprises background information associated without reciting verbatim the textual content displayed on the page of the user-specific personal assessment report.

10. The method of claim 1, wherein a location of the avatar is determined based in part on a location of content displayed on the page.

11. The method of claim 1, further comprising highlighting a first portion of the page displayed in the report region based on the speech of the avatar.

12. The method of claim 1, further comprising:
determining a first shape and a first level of transparency of the avatar region based on the content displayed on the user interface at the first size of the window, and
determining a second shape and a second level of transparency of the avatar region based on the content displayed on the user interface at the second size of the window.

13. The method of claim 1, further comprising: in accordance with the playback of the video of the avatar, automatically updating displaying of the user interface, comprising:
displaying second content on the user interface, and
displaying the avatar at a third location on the user interface and at a third size, wherein the third location and the third size of the avatar are automatically determined according to size and location of the second content on the user interface.

14. The method of claim 1, wherein the second location and the second size of the avatar are determined to minimize the overlap between the avatar and the content displayed on the user interface at the second size.

15. The method of claim 1, further comprising:
obtaining a plurality of scores based on the plurality of answers; and
determining whether a score of the plurality of scores meets a condition, wherein the condition comprises the score being lower than a score threshold, the score being higher than the score threshold, or the score being within a score range, wherein:
in accordance with a determination that the score meets the condition, the playback of the video does not comprise video associated with the score and further does not comprise audio associated with the score.

16. A system for generating and presenting a user-specific personal assessment report, comprising:
one or more processors; and
a memory communicatively coupled to the one or more processors and configured to store instructions that, when executed by the one or more processors, cause the system to:
receive, from a user, a plurality of answers corresponding to a plurality of predetermined questions in a personal assessment questionnaire;
generate, based on the plurality of answers, the user-specific personal assessment report comprising a plurality of static pages;
display a user interface for presenting the user-specific personal assessment report, the user interface comprising:
a report region for displaying a page of the plurality of static pages;
an avatar region for presenting a video of an avatar, wherein:
one or more images of the video of the avatar are generated according to a first output from a first machine-learning model,
the first machine-learning model is trained, using a plurality of images corresponding to an appearance of the avatar, to provide the first output,
the avatar is configured to be partially overlaid on the report region, and
a first location and a first size of the avatar are determined based on content displayed on the page;
receive the user input initiating playback of the user interface;
in response to receiving the user input, initiate playback of the video of the avatar providing speech in the avatar region, wherein the speech of the avatar comprises an audio paraphrase of the page, wherein:
the audio of the paraphrase is generated according to a second output from a second machine-learning model, and
the second machine-learning model receives the plurality of answers and provides the second output according to the received plurality of answers;
receive a user input indicative of resizing a window of the user interface from a first size to a second size; and
determine a second location and a second size of the avatar based on the second size of the user interface and a reduction of an overlap between the avatar and the content displayed on the user interface at the second size.

17. The system of claim 16, wherein the system is further caused to:
obtain a plurality of scores based on the plurality of answers;
select one or more speech segments according to the plurality of scores;
generate a script based on the selected one or more speech segments; and
select one or more of video segments of the avatar from a video repository according to the plurality of scores, wherein the video of the avatar is generated further based on the selected one or more video segments.

18. The system of claim 16, wherein the speech of the avatar comprises background information associated without reciting verbatim the textual content displayed on the page of the user-specific personal assessment report.

19. The system of claim 16, wherein the user interface further comprises a navigation region comprising a plurality of topics for navigating to the plurality of static pages.

20. A non-transitory computer-readable storage medium storing one or more programs, the one or more programs comprising instructions, which when executed by one or more processors of a system, cause the system to perform a method comprising:

receiving, from a user, a plurality of answers corresponding to a plurality of predetermined questions in a personal assessment questionnaire;

generating, based on the plurality of answers, the user-specific personal assessment report comprising a plurality of static pages;

displaying a user interface for presenting the user-specific personal assessment report, the user interface comprising:
- a report region for displaying a page of the plurality of static pages;
- an avatar region for presenting a video of an avatar, wherein:
  - one or more images of the video of the avatar are generated according to a first output from a first machine-learning model,
  - the first machine-learning model is trained, using a plurality of images corresponding to an appearance of the avatar, to provide the first output,
  - the avatar is configured to be partially overlaid on the report region, and
  - a first location and a first size of the avatar are determined based on content displayed on the page;

receiving the user input initiating playback of the user interface;

in response to receiving the user input, initiating playback of the video of the avatar providing speech in the avatar region, wherein the speech of the avatar comprises an audio paraphrase of the page, wherein:
- the audio of the paraphrase is generated according to a second output from a second model, and
- the second machine-learning model receives the plurality of answers and provides the second output according to the received plurality of answers;

receiving a user input indicative of resizing a window of the user interface from a first size to a second size; and determining a second location and a second size of the avatar based on the second size of the user interface and a reduction of an overlap between the avatar and the content displayed on the user interface at the second size.

21. The non-transitory computer-readable storage medium of claim 20, wherein the method further comprises:
obtaining a plurality of scores based on the plurality of answers;

selecting one or more speech segments according to the plurality of scores;

generating a script based on the selected one or more speech segments; and selecting one or more of video segments of the avatar from a video repository according to the plurality of scores, wherein the video of the avatar is generated further based on the selected one or more video segments.

22. The non-transitory computer-readable storage medium of claim 20, wherein the speech of the avatar comprises background information associated without reciting verbatim the textual content displayed on the page of the user-specific personal assessment report.

23. The non-transitory computer-readable storage medium of claim 20, wherein the user interface further comprises a navigation region comprising a plurality of topics for navigating to the plurality of static pages.

* * * * *